United States Patent
Jalfon

(10) Patent No.: US 7,051,062 B2
(45) Date of Patent: May 23, 2006

(54) APPARATUS AND METHOD FOR ADDING MULTIPLE-BIT BINARY-STRINGS

(75) Inventor: Michel Jalfon, Modiin (IL)

(73) Assignee: Analog Devices, Inc., Norwood, MA (US)

( * ) Notice: Subject to any disclaimer, the term of this patent is extended or adjusted under 35 U.S.C. 154(b) by 737 days.

(21) Appl. No.: 10/238,711

(22) Filed: Sep. 10, 2002

(65) Prior Publication Data
US 2004/0049528 A1    Mar. 11, 2004

(51) Int. Cl.
G06F 7/50    (2006.01)

(52) U.S. Cl. ...................................... 708/709; 708/552

(58) Field of Classification Search ................ 708/709, 708/552, 498
See application file for complete search history.

(56) References Cited

U.S. PATENT DOCUMENTS

| | | | | |
|---|---|---|---|---|
| 5,301,341 | A * | 4/1994 | Vassiliadis et al. | ......... 712/215 |
| 6,449,629 | B1 * | 9/2002 | Morgan | ...................... 708/518 |
| 6,925,480 | B1 * | 8/2005 | Duborgel | .................... 708/523 |
| 2003/0163504 | A1 * | 8/2003 | Knowles | ..................... 708/708 |

OTHER PUBLICATIONS

Elguibaly, F., *Overflow Handling in Inner-Product Porcessors*, IEEE Transactions on Curcuits and Systems-II: Analog and Digital Signal Processing, Vo.. 47, No. 10, Oct. 2000, pp. 1086-1090.

* cited by examiner

*Primary Examiner*—D. H. Malzahn
(74) *Attorney, Agent, or Firm*—Wolf, Greenfield & Sacks, P.C.

(57) ABSTRACT

Apparatus for determining a value, a sign and an overflow status of an addition of at least three n-bit data inputs. The apparatus comprising: a first adder, for adding the at least three n-bit data inputs, to provide a first output having at least 2n bits; a second adder for adding a portion of bits of the first output, the second adder being operable to add a plurality of m-bit addends, m being smaller than or equal to n. The apparatus further comprising at least two electronic-circuits, operatively associated with the first adder and the second adder. The first adder, the second adder and the at least two electronic-circuits are constructed and designed to obtain the value, the overflow status and a sign of the addition of the at least three data inputs, using predetermined parity rules being associated with a parity characteristic of the at least three data inputs.

97 Claims, 11 Drawing Sheets

APPARATUS AND METHOD FOR ADDING MULTIPLE-BIT BINARY-STRINGS

FIELD OF THE INVENTION

The present invention relates to digital arithmetic in general and more particularly but not exclusively to an apparatus and a method for adding multiple-bit binary-strings and determining presence of overflow.

BACKGROUND OF THE INVENTION

Modern data processor process large amounts of data in a relatively short amount of time. In the drive to produce ever faster data processor, one of the critical speed limitations to overcome is the arithmetic logic unit speed. Therefore, any speed improvement in digital logic and the arithmetic logic unit, can directly affect modern data processor speed.

Digital data processor arithmetic involves the development of complex logic circuitry and of efficient algorithms utilizing the available hardware. Given that numbers in a digital data processor are represented as binary-strings of zeros and ones, and that hardware can perform only a relatively simple and primitive set of Boolean operations, all the arithmetic operations performed are based on a hierarchy of operations, the building blocks of which are the basic arithmetic operations.

One essential basic arithmetic operation repeatedly performed by a digital data processor is the addition operation, which is carried out by electronic circuits known as adders. An introductory description of adders can be found in a book by K. Hwang, entitled "Computer Arithmetic" published by John Wiley & Sons, New York, 1979, the contents of which are hereby incorporated by reference. Nevertheless, for the purpose of providing a complete and self contained description, an introductory explanation of the principles of binary arithmetic and the operations of binary components is given hereinbelow.

The most basic addition is an addition of two binary bits. Since each bit has only two possible values, 0 or 1, there are only four possible combinations of inputs. These four possibilities, and the resulting sums, are 0+0=0, 1+0=1, 0+1=1 and 1+1=10. The output (10) of the latter example is referred to as a 2-bit binary-string, or a 2-bit binary number, where the position of each bit represents the weight of the respective bit. Thus, in the binary-string 10, the weight of the "1" bit is double that of the weight of the "0" bit. A situation in which the number of output bits exceeds the number of input bits is known as overflow.

An adder which performs the addition of two binary bits consists of two output channels. One output is referred to as the sum and the other output is referred to as the carry. In the example of 1+1=10, the sum is the bit "0" and carry is the bit "1", while in the other three examples the carry is the bit "0", and the sum represent the correct addition result. The addition of two binary bits may be represented by two primitive logic gates: the carry output can be obtained by an AND gate and the sum bit which represents the rightmost bit can be obtained by a exclusive-OR gate, also known as a XOR gate. Such a simple adder is called a half-adder (HA) and is illustrated in FIG. 1.

When adding multiple-bit numbers, each pair of bits can produce an output carry, and an adder must be able to recognize and include a carry from a lower weight. This can be done by using two HA circuits. The first HA adds the two bits to produce a partial sum, while the second HA adds the carry of the first HA to partial sum to produce the final output. Such an adder is called a full-adder (FA). The logical gates of a FA are illustrated in FIG. 2a.

A common practice in logic diagrams is to represent any complex function as a "black box" having input and output signals designated, thereby defining the complex function as a primitive which can be used in more complex diagrams. As the full adder is a basic building brick of almost any logic diagram, it is commonly designated by a separate symbol, shown in FIG. 2b. The inputs to the full adder are three binary bits (the two binary bits of the present weight and one carry from the lower weight). The outputs of the full adder are two binary bits: a sum and a carry.

Full adders are typically concatenated to each other, forming adder circuitry for addition of multiple-bit numbers. In a modern processor, the adder circuitry includes a way of negating one of the input numbers directly, so that the circuit is operable to perform either addition or subtraction on demand. Other functions are commonly included in modern implementations of the adder circuit, especially in modern microprocessors. The two most commonly encountered adder circuitry types are ripple-carry adders and carry-save adders.

FIG. 3a is a simplified diagram of a ripple-carry adder designed for adding two 4-bit numbers. Each FA is devoted to sum two bits of different weight. In ripple-carry adders addend bits of the same weight are added together, and a first carry bit is transferred to an adjacent higher FA when required. The final sum is directly derived from a bit-by-bit addition, with an appropriate carry to an adjacent higher order bit position and a single bit carry out from the highest order bit position. Addition, using the ripple-carry adder cannot be executed simultaneously for all the bits, since each FA needs the output carry from the preceding lower weight FA as an input before adding the bits. In other words, the propagation of the carry from one bit to the next bit tends to result in slow, non-parallel, operations of the ripple-carry adder because high order bit computations are dependent on the results from low order bits.

The above principles may be employed also for a ripple-carry adder for adding two n-bit numbers, where the inputs are two n-bit numbers and a binary bit input carry, and the output is one n-bit number and a binary bit output carry. A ripple-carry adder for adding two n-bit numbers is referred to as a 2:1 n-bit ripple-carry adder and it is commonly designated by a separate symbol, shown in FIG. 3b.

A more efficient adder with respect to resulting computation delay is a carry-save adder. In carry-save adders, carry bits are accumulated separately from the sum bits of any given weight, thus, the addition process of all the weights is executed simultaneously. Consequently, the outputs of a carry-save adder are two binary-strings: a sum binary-string and a carry binary-string, which when added together yield the final result. The benefit of a first carry-save adder is that high order bits do not depend on any low order bit because all bit positions are calculated independently, thereby avoiding the propagation latency associated with carry bits in ripple-carry adders. Because of their speed and simplicity, carry-save adders are pervasively found in digital logic designs.

Reference is now made to FIG. 4a, which is a simplified diagram of a carry-save adder for adding three 4-bit numbers. The shown carry-save-adder includes four FAs each designed to add three equal-weight bits (one from each of the three 4-bit numbers), and to output a carry, C, and a sum, S. A carry-save adder which is designed for adding three n-bits numbers is referred to as a 3:2 n-bits carry-save adder and is commonly designated by a separate symbol, shown in FIG. 4b. One would appreciate that in the case of n-bit numbers, there are 2n output bits which may be referred in more than one S/C combination, e.g., S[n−1:0] and C[n−1:0] (FIG. 4a) or S[n−1:0] and C[n:1] (FIG. 4b).

A somewhat more complicated carry-save-adder is a 4:2 carry-save adder which is designed to add 4 operands to output two strings (a sum, S, and a carry, C). A typical case is a 4:2 carry-save adder for 4-bit operands illustrated in FIG. 4c. In FIG. 4c, three of the four operands, A, B and D, are fed into a first 3:2 carry-save adder, while the fourth operand, E, is fed directly into a second 3:2 carry-save adder together with the intermediate sum and carry outputted from the first 3:2 carry-save adder. An additional carry-in, $C_{in}$, may be also used, by feeding it into the second 3:2 carry-save adder (see FIG. 4c), where no carry-in is equivalent to $C_{in}$=0. A 4:2 n-bits carry-save adder is commonly designated by a separate symbol, shown in FIG. 4d.

Irrespectively of the type of adder circuitry which is being used for adding multiple-bit numbers, the weights, that is to say the number of bit positions, of the inputs, dictates the number of elementary full adders which are needed to construct the adder circuitry. When the digital codes of the numbers are added and the output obtained by the addition exceeds the range that can be expressed by the number of bits of the output signal, overflow occurs and an overflow signal is generated by the adder. A detailed description of overflow detection can be found, e.g., in an article by Fayez Elguibaly, entitled "Overflow Handling in Inner-Product Processors", published in *IEEE Transactions on Circuits and Systems II: Analog and Digital Signal Processing*, Vol. 47, No. 10 (2000). The overflow signal is important as both a reference signal for many control applications and for judging whether the adding result is correct or not. For example, for a 4-bit adder, if the adding result is 16, a 4-bit data output would be 0000. In this example, the signal at the output of the adder does not indicate a correct value because the adder is in overflow status. The overflow signal can be used to indicate the error, and/or to correct the adding result using the carry which indicates the overflow status of the adder.

It is recognized that for adding more than two multiple-bit numbers, more carries may be generated in the summing processes and the number of elementary full adders required may exceed the weights of the inputs. In such calculations, which require many additions in series, carry-save adder circuits are cascaded together. These additions often lead to an overflow condition both in intermediate additions results and in the final sum, which need to be detected in order to avoid large oscillations in the sampled outputs. This condition is called overflow oscillation. The cascading of these additions requires optimization of each addition operation so as both to decrease the occupied silicon area, and to increase the speed with which the adder cascades its output to the next carry-save adder stage. Prior art methods to detect an overflow when adding up a plurality of n-bit operands requires expanding the width of the data-path to more than n bits. Specifically, the minimal number of bits which are needed to represent a sum of k n-bit operands, is $n+\lceil \log_2(k) \rceil$ bits, where $\lceil \; \rceil$ denotes the CEILING operation. However, in most of the applications, not all the bits are needed to be stored in a register for further data processing. Thus, prior art methods lead to unnecessary degradation in terms of both speed and area.

As stated, an adder is also used for performing a subtraction operation, by negating one or more of the inputs. The method of negating a binary-string depends on the sign representation of the binary-string, for example, in two's complement binary-strings a negation is by determining a two's complement value and adding 1 to the least significant bit. Besides being used to perform addition or subtraction, the adder is also an integral part of the multiplier, thus playing an important role in the multiplication operation. Thus, the adder speed is a significant limiting factor on the overall speed of a data processor.

There is thus a widely recognized need for, and it would be highly advantageous to have a method and apparatus for adding, subtracting and detecting presence and direction of overflow n-bit data inputs, devoid of the above limitations.

SUMMARY OF THE INVENTION

According to one aspect of the present invention there is provided apparatus for determining a value and an overflow status of an addition of at least three n-bit data inputs, wherein n is an integer, the apparatus comprising: a first adder, for adding the at least three n-bit data inputs, to provide a first output having at least 2n bits; a second adder for adding a portion of bits of the first output, the second adder being operable to add a plurality of m-bit addends, m being smaller than or equal to n; at least two electronic-circuits, operatively associated with the first adder and the second adder; the first adder, the second adder and the at least two electronic-circuits are constructed and designed to obtain the value and the overflow status of the addition of the at least three data inputs, using predetermined parity rules being associated with a parity characteristic of the at least three data inputs.

According to still further features in the described preferred embodiments at least one of the at least two electronic-circuits is operable to determine a sign-bit of the addition of the at least three data inputs, using a predetermined sign rule.

According to still further features in the described preferred embodiments the first adder is an n-bit adder.

According to still further features in the described preferred embodiments the second adder is an n-bit adder.

According to still further features in the described preferred embodiments the second adder is an n−1-bit adder.

According to still further features in the described preferred embodiments each of the at least two electronic-circuits is operable to execute a plurality of operations, each independently selected from the group consisting of: concatenation, inversion and truncation of at least one bit.

According to still further features in the described preferred embodiments at least one of the at least two electronic-circuits comprises a parity-logic-circuit for receiving the at least three data inputs and for outputting sign-distribution information.

According to still further features in the described preferred embodiments at least one of the at least two electronic-circuits comprises an arbitrator, for arbitrating the overflow status using at least two bits outputted from the second adder so as to provide an overflow flag, OVF, characterizing the overflow status.

According to still further features in the described preferred embodiments the at least three n-bit data inputs are 4 n-bit binary-strings, and further wherein the at least two electronic-circuits are a first electronic-circuit and a second electronic-circuit.

According to still further features in the described preferred embodiments the second adder is operable to generate a second sum, R, comprising n bits.

According to still further features in the described preferred embodiments the second electronic-circuit comprises an arbitrator for arbitrating the overflow status using at least two bits outputted from the second adder and the predetermined parity rules, so as to provide an overflow flag, OVF, characterizing the overflow status.

According to still further features in the described preferred embodiments the at least three n-bit data inputs are 3 n-bit binary-strings and further wherein the at least two electronic-circuits are a first electronic-circuit and a second electronic-circuit.

According to still further features in the described preferred embodiments the first adder is an n-bit adder and the second adder is an n−1-bit adder.

According to still further features in the described preferred embodiments the first adder is operable to generate a first sum, S, comprising n bits and a first carry, C, comprising n bits.

According to still further features in the described preferred embodiments the first electronic-circuit is operable to: (a) truncate a least significant bit, S[0] from the first sum, S, so as to redefine the first sum, S, to be an n−1-bit binary-string, S[n−1:1]; and (b) truncate a most significant bit, C[n], from the first carry, C, so as to redefine the first carry, C, to be an n−1-bit binary-string, C[n−1:1].

According to still further features in the described preferred embodiments the second adder is operable to generate a second sum, R, and a second carry, D, each of the R and the D comprising n−1 bits.

According to still further features in the described preferred embodiments the second electronic-circuit comprises an arbitrator, for arbitrating the overflow status using at least two bits outputted from the second adder and the predetermined parity rules, so as to provide an overflow flag, OVF, characterizing the overflow status.

According to still further features in the described preferred embodiments the first electronic-circuit comprise a parity-logic-circuit operable to determine a parity query, Q, using most significant bits of the 3 n-bit binary-strings.

According to another aspect of the present invention there is provided a method of determining a value and an overflow status of an addition of at least three n-bit data inputs, wherein n is an integer, the method comprising: adding the at least three n-bit data inputs using a first adder, so as to provide a first output having at least 2n bits; adding a portion of bits of the first output, using a second adder which is operable to add a plurality of m-bit addends, m being smaller than or equal to n; and using a portion of bits from the first output, a portion of bits outputted from the second adder and predetermined parity rules, associated with a parity characteristic of the at least three data inputs, for determining the value and the overflow status of the addition of the at least three n-bit data inputs.

According to still further features in the described preferred embodiments the method further comprising determining a sign-bit of the addition of the at least three data inputs, using a predetermined sign rule.

According to still further features in the described preferred embodiments the at least three data inputs are two's complement binary-strings.

According to still further features in the described preferred embodiments the first adder is an n-bit adder.

According to still further features in the described preferred embodiments the second adder is an n-bit adder.

According to still further features in the described preferred embodiments the second adder is an n−1-bit adder.

According to still further features in the described preferred embodiments the determining is by executing a plurality of operations, each independently selected from the group consisting of: concatenation, inversion and truncation of at least one bit.

According to still further features in the described preferred embodiments the method further comprising determining a sign-distribution of the at least three data inputs.

According to still further features in the described preferred embodiments the at least three n-bit data inputs are 4 n-bit binary-strings.

According to still further features in the described preferred embodiments each of the first and the second adder is an n-bit adder.

According to still further features in the described preferred embodiments the method further comprising determining a parity query, Q, using most significant bits of the 4 n-bit binary-strings; and inverting a most significant bit, S[n], of the first sum, S, if and only if the parity query, Q, is odd.

According to still further features in the described preferred embodiments the method further comprising truncating a least significant bit, S[0], from the first sum, S, so as to redefine the first sum, S, to be an n-bit binary-string, S[n:1].

According to still further features in the described preferred embodiments the method further comprising generating a second sum, R, comprising n bits.

According to still further features in the described preferred embodiments the method further comprising setting an overflow flag, OVF, characterizing the overflow status, using two bits of the second sum, R, and using the predetermined parity rules.

According to still further features in the described preferred embodiments the at least three n-bit data inputs are 3 n-bit binary-strings.

According to still further features in the described preferred embodiments the first adder is an n-bit adder and the second adder is an n−1-bit adder.

According to still further features in the described preferred embodiments the first output comprises a first sum, S, comprising at least n bits and a first carry, C, comprising at least n bits.

According to still further features in the described preferred embodiments the method further comprising: truncating a least significant bit, S[0], from the first sum, S, so as to redefine the first sum, S, to be an n−1-bit binary-string, S[n−1:1]; and truncating a most significant bit, C[n], from the first carry, C, so as to redefine the first carry, C, to be an n−1-bit binary-string, C[n−1:1].

According to still further features in the described preferred embodiments the method further comprising generating a second sum, R, and a second carry, D, each of the R and the D comprising n−1 bits.

According to still further features in the described preferred embodiments the method further comprising determining a parity query, Q using most significant bits of the 3 n-bit binary-strings.

According to yet another aspect of the present invention there is provided an apparatus for determining a value an overflow status of an addition or a subtraction of 4 n-bit binary-strings, wherein n is an integer, the apparatus comprising: a first adder for simultaneously adding the 4 n-bit binary-strings to generate a first sum, S, and a carry, C, the first adder being an n-bit adder; a first electronic-circuit, for redefining the first sum, S, using predetermined parity rules, the predetermined parity rules being associated with a parity characteristic of the 4 n-bit binary-strings; a second adder for adding the first sum, S, and the carry, C, so as to provide a second sum, R, the second adder being an n-bit adder; and a second electronic-circuit, for determining the value and the overflow status of the 4 n-bit binary-strings, using bits outputted from the first electronic-circuit and from the first adder.

According to still further features in the described preferred embodiments second electronic-circuit is operable to determine a sign-bit of the addition of the 4 n-bit binary-strings, using a predetermined sign rule.

According to still further features in the described preferred embodiments the 4 n-bit binary-strings are two's complement binary-strings.

According to still further features in the described preferred embodiments the first electronic-circuit comprises a parity-logic-circuit for receiving the 4 n-bit binary-strings and for outputting sign-distribution information.

According to still further features in the described preferred embodiments the first sum, S, comprises at least n+1 bits and a the first carry, C, comprises at least n bits.

According to still further features in the described preferred embodiments the first electronic-circuit comprise a parity-logic-circuit operable to determine a parity query, Q, using most significant bits of the 4 n-bit binary-strings, and further wherein the first electronic-circuit comprise a multiplexing-circuit operable to invert a most significant bit, $S[n]$, of the first sum, S, if and only if the parity query, Q, is odd.

According to still further features in the described preferred embodiments the first electronic-circuit is operable to truncate a least significant bit, $S[0]$, from the first sum, S, so as to redefine the first sum, S, to be an n-bit binary-string, $S[n:1]$.

According to still further features in the described preferred embodiments the second sum, R, comprises n+1 bits.

According to still further features in the described preferred embodiments the arbitrator operable to execute a first conditional operation on two bits of the second sum, R, to set the overflow flag, OVF, the two bits designated $R[n]$ and $R[n-1]$.

According to still another aspect of the present invention there is provided an apparatus for determining a value, a sign-bit and an overflow status of an addition or a subtraction of 3 n-bit binary-strings, wherein n is an integer, the apparatus comprising: a first adder for simultaneously adding the 3 n-bit binary-strings to generate a first sum, S, and a first carry, C, the first adder being an n-bit adder; a first electronic-circuit, for truncating the first sum, S, and the first carry, C, so that the first sum, S, and the first carry, C, comprises n−1 bits; a second adder for adding the first sum, S, and the carry, C, so as to provide a second sum, R, and a second carry, D, the second adder being an n−1-bit adder; and a second electronic-circuit, for determining the value and the overflow status of the 3 n-bit binary-strings, using bits outputted from the first electronic-circuit and from the first adder.

According to still further features in the described preferred embodiments the second electronic-circuits is operable to determine a sign-bit of the addition of the 3 n-bit binary-strings, using a predetermined sign rule.

According to still further features in the described preferred embodiments the 3 n-bit binary-strings are two's complement binary-strings.

According to still further features in the described preferred embodiments each of the first and the second adders is independently selected from the group consisting of a carry-save adder and a ripple-carry adder.

According to still further features in the described preferred embodiments each of the first and the second electronic-circuit is operable to execute a plurality of operations, each independently selected from the group consisting of: concatenation, inversion and truncation of at least one bit.

According to still further features in the described preferred embodiments the first electronic-circuit comprises a parity-logic-circuit for receiving the 3 n-bit binary-strings and for outputting sign-distribution information.

According to still further features in the described preferred embodiments the first adder is an n-bit adder and the second adder is an n−1-bit adder.

According to still further features in the described preferred embodiments the first sum, S, comprises n bits and the first carry, C, comprises n bits.

According to still further features in the described preferred embodiments the first electronic-circuit is operable to: (a) truncate a least significant bit, $S[0]$ from the first sum, S, so as to redefine the first sum, S, to be an n−1-bit binary-string, $S[n-1:1]$; and (b) truncate a most significant bit, $C[n]$, from the first carry, C, so as to redefine the first carry, C, to be an n−1-bit binary-string, $C[n-1:1]$.

According to still further features in the described preferred embodiments each of the second sum, R, and the second carry, D, comprises n−1 bits.

According to still further features in the described preferred embodiments a least significant bit, $R[0]$, of the second sum, R, equals a least significant bit, $S[0]$, of the first sum, S.

According to still further features in the described preferred embodiments n least significant bits of the addition value of the 4 n-bit binary-strings are n least significant bits of the second sum, R.

According to still further features in the described preferred embodiments n least significant bits of the addition value of the 3 n-bit binary-strings are n least significant bits of the second sum, R.

According to still further features in the described preferred embodiments the second electronic-circuit comprises an arbitrator, for arbitrating the overflow status using at least two bits outputted from the second adder so as to provide an overflow flag, OVF, characterizing the overflow status.

According to still further features in the described preferred embodiments the first electronic-circuit comprise a parity-logic-circuit operable to determine a parity query, Q using most significant bits of the 3 n-bit binary-strings.

According to an additional aspect of the present invention there is provided an arithmetic and logic unit for digital computing, the unit comprising adding circuitry, the adding circuitry being operable to determine a value and an overflow status of an addition of at least three n-bit data inputs, wherein n is an integer, the adding circuitry comprising: a first adder, for adding the at least three n-bit data inputs, to provide a first output having at least 2n bits; a second adder for adding a portion of bits of the first output, the second adder being operable to add a plurality of m-bit addends, m being smaller than or equal to n; at least two electronic-circuits, operatively associated with the first adder and the second adder; the first adder, the second adder and the at least two electronic-circuits are constructed and designed to obtain the value, the overflow status and a sign of the addition of the at least three data inputs, using predetermined parity rules being associated with a parity characteristic of the at least three data inputs.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
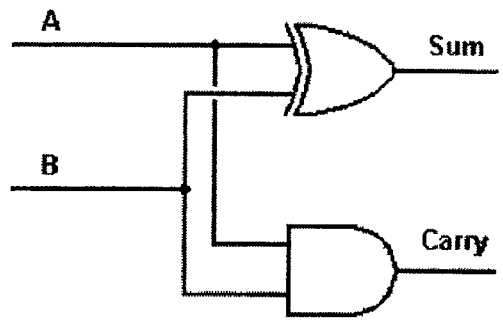
FIG. 1 is a simplified diagram of a half-adder, according to prior art teachings.
Figure 2A:
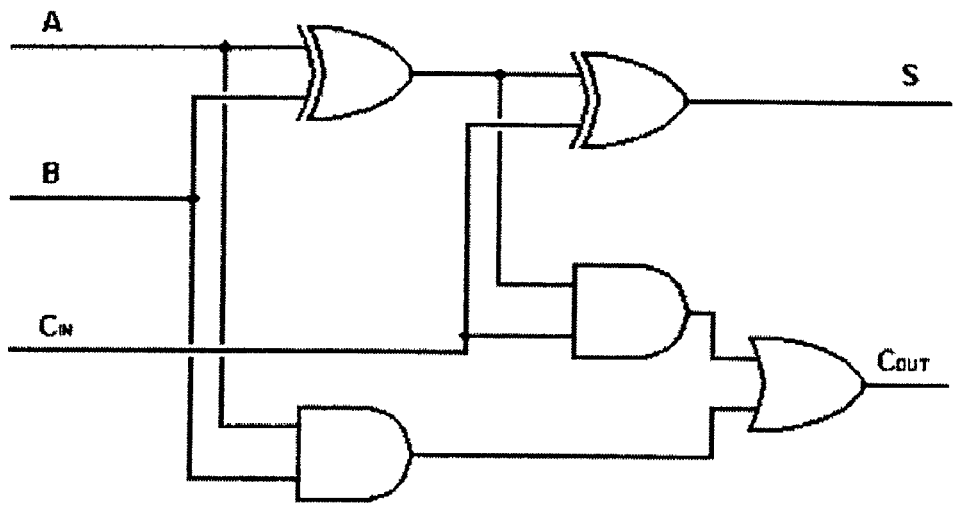
FIG. 2a is a simplified diagram of a full-adder, according to prior art teachings.
Figure 2B:
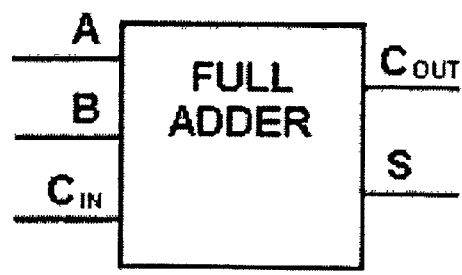
FIG. 2b is a full-adder symbol, according to prior art teachings.
Figure 3A:
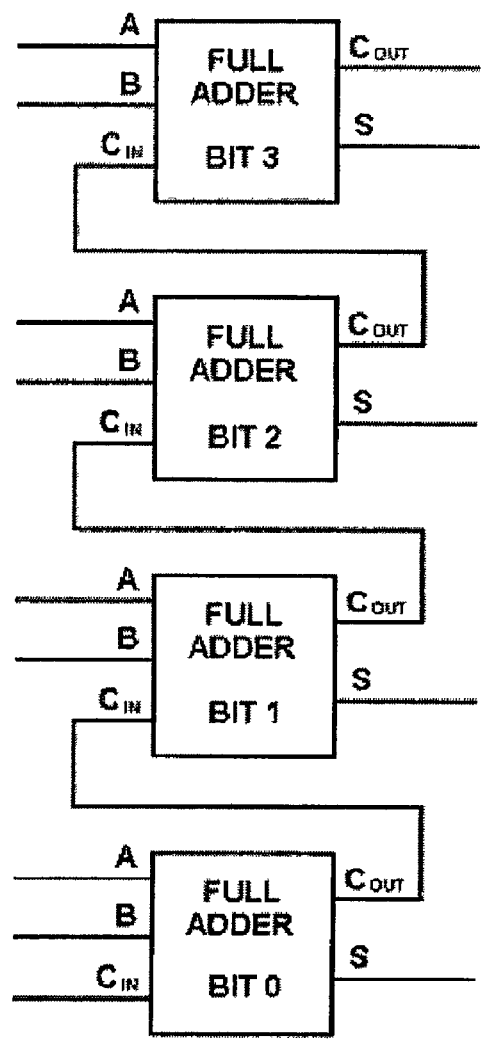
FIG. 3a is a simplified diagram of a ripple-carry adder, designed for adding two 4-bit numbers, according to prior art teachings.
Figure 3B:
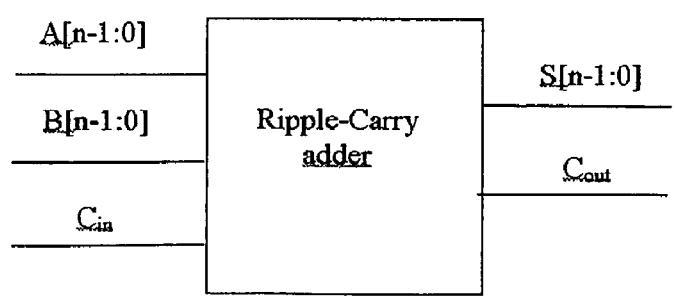
FIG. 3b is a ripple-carry adder symbol, according to prior art teachings.
Figure 4A:
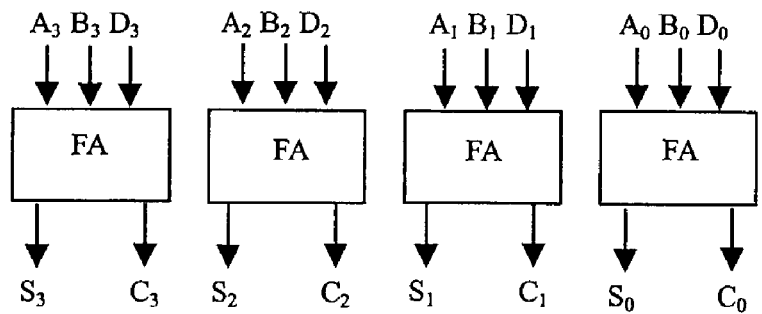
FIG. 4a is a simplified diagram of a 3:2 4-bit carry-save adder, according to prior art teachings.
Figure 4B:
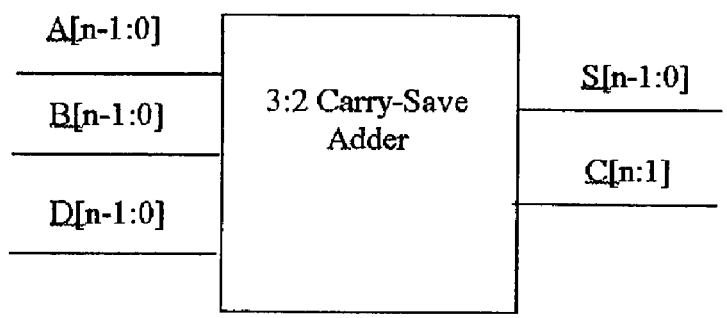
FIG. 4b is a 3:2 n-bit carry-save adder symbol, according to prior art teachings.
Figure 4C:
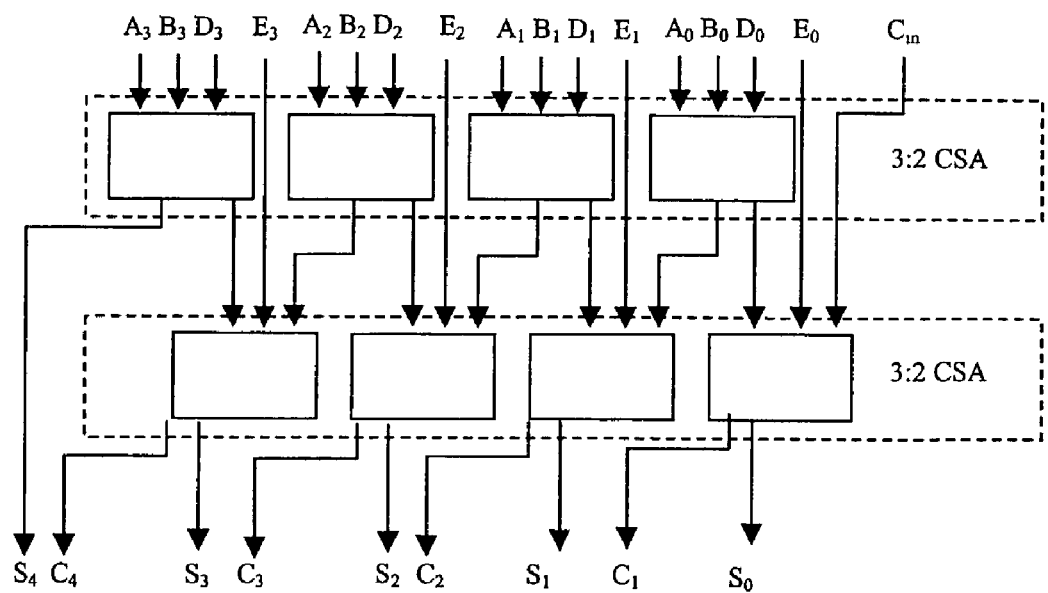
FIG. 4c is a simplified diagram of a 4:2 4-bit carry-save adder, according to prior art teachings.
Figure 4D:
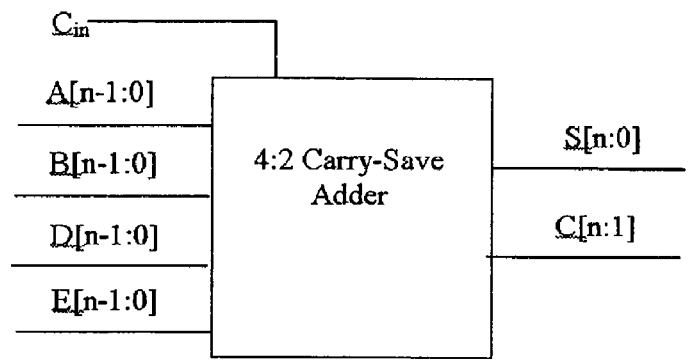
FIG. 4d is a 4:2 n-bit carry-save adder symbol, according to prior art teachings.

The present embodiments relate to an apparatus and a method of determining a value, a sign-bit and an overflow status of an addition of a plurality of data inputs, which can be used for performing digital arithmetic. More specifically, the present embodiments can be used for adding or subtracting a plurality of n-bit binary-strings, using adders operable on n bits or less than n bits.

The principles and operation of an apparatus and a method of determining a value, a sign-bit and an overflow status of an addition or a subtraction of a plurality of data inputs, according to the teachings of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present embodiments are primarily directed to an apparatus and a method for reducing the number of elementary full adders when adding a plurality of multiple-bit binary-strings.

Figure 5:
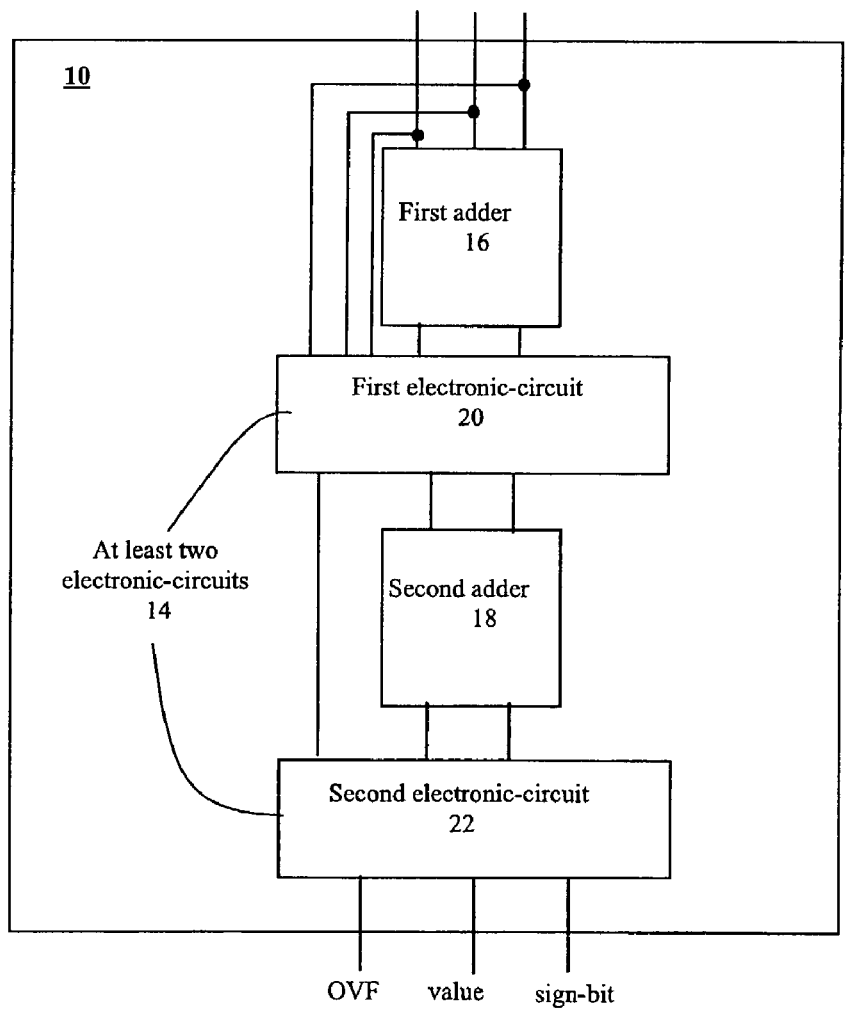
FIG. 5 is a simplified block diagram of an apparatus for determining a value, a sign-bit and an overflow status of an addition or a subtraction of at least three n-bit data inputs, according to a preferred embodiment of the present invention.

Thus, according to one aspect of the invention there is provided an apparatus, for determining a value, a sign-bit and an overflow status of an addition or a subtraction of at least three n-bit data inputs. Reference is now made to FIG. 5, which is a simplified block diagram of apparatus 10. As shown in FIG. 5, apparatus 10 comprises a first adder 16 and a second adder 18, each operable to add a plurality of m-bit addends, where m is smaller than or equal to n. First adder 16 and second adder 18 serve for adding the data inputs and some intermediate results, such as intermediate carries and intermediate sums which are obtained while apparatus 10 is in operation mode.

Apparatus 10 further comprises at least two electronic-circuits 14, operatively associated with first adder 16 and second adder 18. Each electronic-circuit is preferably operable to execute a plurality of conventional binary operations, such as but not limited to, concatenation, inversion and truncation of at least one bit, outputted by or inputted into any of first adder 16 and second adder 18. In addition, the electronic-circuits are operable to receive the data inputs and to output sign-distribution information, as further detailed hereinunder. As shown in FIG. 5, at least two electronic-circuits 14 preferably comprise a first electronic-circuit 20 and a second electronic-circuit 22. Broadly speaking, first electronic-circuit 20 serves for manipulating bits which are outputted from first adder 16, and second electronic-circuit 22 serves for arbitrating the overflow status and obtaining the sign and the value of the addition, using bits which are outputted from second adder 18. In FIG. 5, straight-solid lines represent binary inputs and outputs to and from the components of apparatus 10, respectively.

Before providing a further detailed description of the present embodiments as delineated hereinabove and in accordance with the present invention, attention will be given to the advantages offered thereby. As stated, the minimal number of bits which are needed to represent a sum of k n-bit operands, is $n+\lceil \log_2(k) \rceil$ bits. According to a preferred embodiment of the present invention, only n or less bits are used by the adders for performing the addition of the input. Thus, the present embodiments provide a considerable saving both in processing time and in allocated area of a digital processor. As further detailed and demonstrated hereinafter, n-bit or less than n-bit adders, supplemented with predetermined logical rules, are sufficient to provide: (a) the value of the addition, (b) the sign-bit of the addition, and (c) an overflow flag, OVF, which characterizes the overflow status of the addition of the data inputs.

It would be appreciated that one or more of the inputs to apparatus 10 may be negated prior to inputting. Thus, it is not intended to limit the scope of the invention to an addition operation. Hence, beside addition, apparatus 10 may be used for the purpose of subtracting at least three least three data inputs.

While reducing the present invention to practice, it has been realized by the inventor that the preferred type and size of first adder 16 and of second adder 18 depends on the number of data inputs which are to be added.

In one embodiment the data input consists of 4 n-bit binary-strings, conveniently written as X[n−1:0], Y[n−1:0], Z[n−1:0] and W[n−1:0], i.e., for each n-bit binary-string, the most significant bit is in position n−1, and the least significant bit is in position 0.

As used herein, the term "binary-string" refers to a plurality of bits, each having a different weight represented by a different position. The binary-strings may represent any object that can be processed by a data processor, such as, but not limited to, a decimal number or a character.

Figure 6:
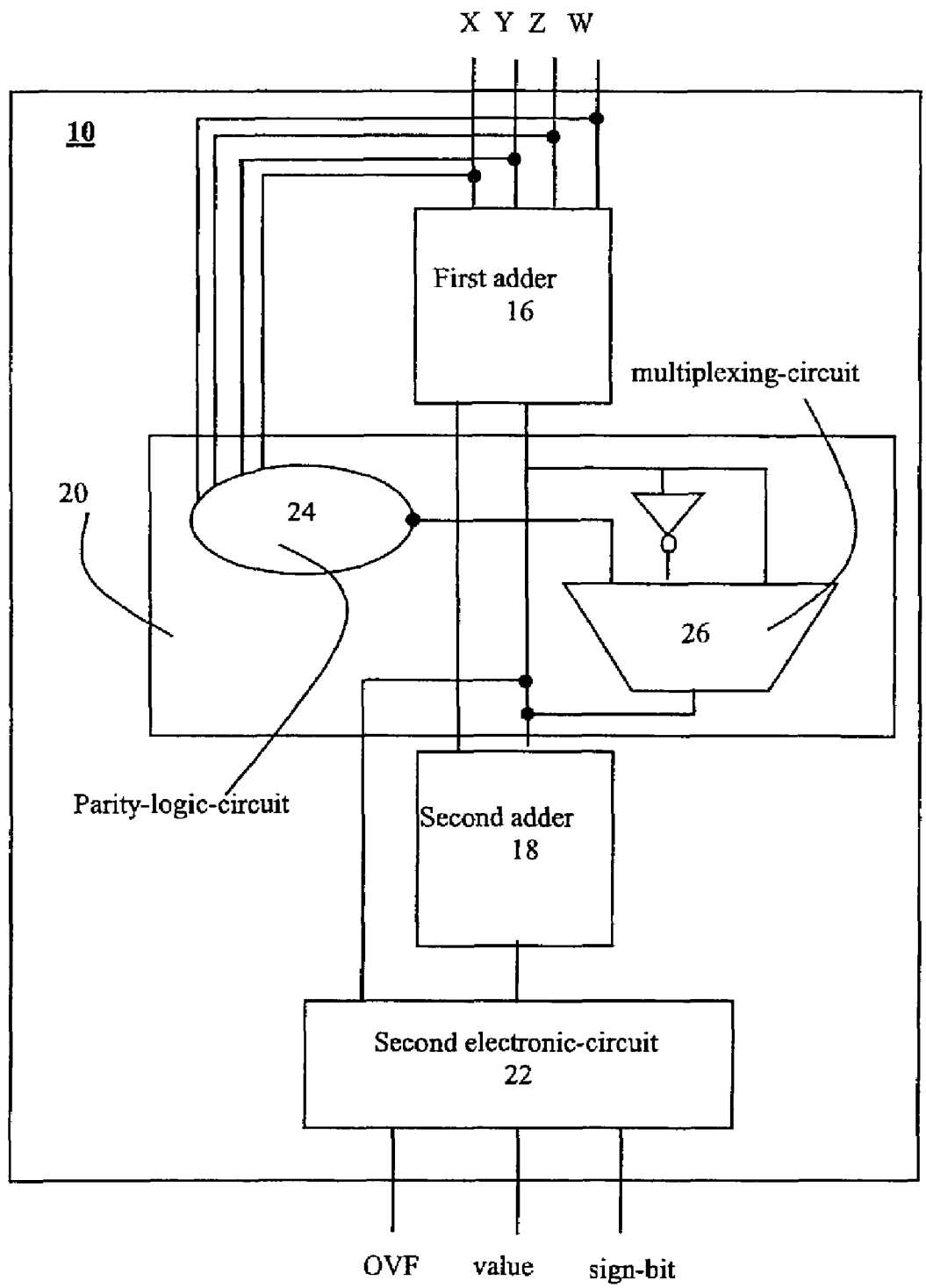
FIG. 6 is a simplified block diagram of the apparatus, in a preferred embodiment of the present invention in which the apparatus processes 4 n-bit binary-strings.

Reference is now made to FIG. 6, which is a simplified block diagram of apparatus 10, in a preferred embodiment in which apparatus 10 processes 4 n-bit binary-strings, and showing in greater detail the first electronic circuit 20. In this embodiment, both first 16 and second 18 adders are n-bit adders. More specifically, first adder 16 is preferably a 4:2 carry-save-adder and second adder 18 is preferably a 2:1 adder, which may be, for example, a ripple-carry-adder. Thus, first adder 16 is fed by the 4 n-bit binary-strings and generates a first sum, S, which comprises n+1 bits, and a first carry, C, which comprising n bits. Without limiting the scope of the invention, the bits of the first sum are referred to hereinafter as bit 0 through bit n, i.e., S=S[n:0]. Further without limiting the scope of the invention, the bits of the first carry are referred to hereinafter as bit 1 through bit n, i.e., C=C[n:1].

According to a preferred embodiment of the present invention first electronic-circuit 20 serves for two purposes: a first purpose is to calculate, either subsequently or in parallel to the operation of first adder 16, a parity query, Q, and a second purpose is to redefine S so that both S and C are simultaneously fed into second adder 18. Preferably, the parity query, Q, is determined by a parity-logic-circuit 24, using the most significant bits of all 4 n-bit binary-strings. Mathematically, the parity query, Q, is written as:

$$Q = X[n-1] + Y[n-1] + Z[n-1] + W[n-1]. \quad (EQ. 1)$$

One ordinarily skilled in the art would appreciate that the value of Q as calculated from Equation 1, depends on the sign distribution of the 4 n-bit input binary-strings: if three input binary-strings have the same sign and one input binary-string has the opposite sign then Q is odd, in all other cases Q is even. Parity-logic-circuit 24 may include a plurality of logical gates, in a suitable arrangement to allow the determination of Q. As will be shown below, in a preferred embodiment, only certain parity characteristics of Q (rather than its explicit value) are needed. Specifically, according to a preferred embodiment of the present invention it is sufficient to determine the value of Q if and only if Q is even, whereas if Q is odd, the exact value of Q is not needed.

Figure 7:
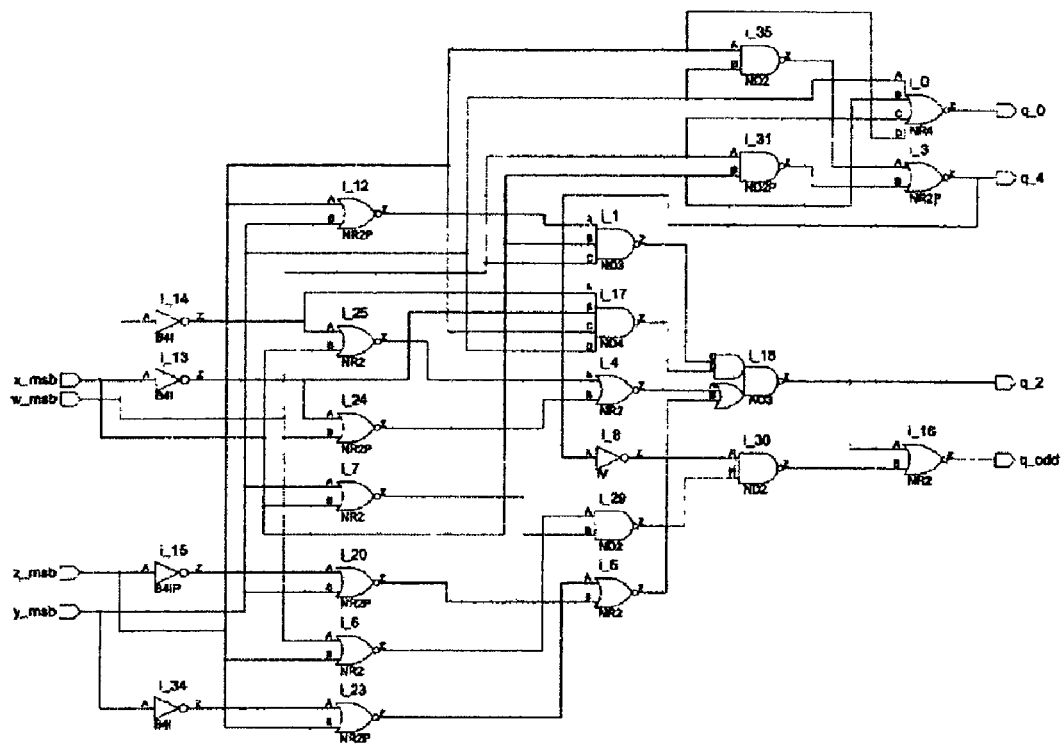
FIG. 7 shows one possible configuration of the various gates of a parity-logic-circuit, for 4 n-bit binary-string input, according to a preferred embodiment of the present invention.

Reference is now made to FIG. 7, detailing one possible configuration of the various gates of parity-logic-circuit 24. The most significant bits of each of the 4 inputs strings are fed into parity-logic-circuit 24 to produce 4 bits, designated q_0, q_2, q_4, q_odd. These output-bits infer whether or not Q is odd, and, if Q is even, whether Q equals 0, 2 or 4. More specifically, for Q=0 q_0 is 1 and all other output bits are 0, for Q=2 q_2 is 1 and all other output bits are 0, for Q=4 q_4 is 1 and all other output bits are 0 and for odd Q q_odd is 1 while all other output bits are 0.

The second purpose of first electronic-circuit 20 is preferably executed by a multiplexing-circuit 26 which (i) truncates a least significant bit, S[0], of S and (ii) inverts its most significant bit, S[n], if and only if Q is odd. Hence, multiplexing-circuit 26 is connected to parity-logic-circuit 24 in a manner that the output of parity-logic-circuit 24 is one of the inputs of multiplexing-circuit 26. As will be shown below, the bit S[0], which has been truncated from S is directly used as the least significant bit of the result.

Mathematically, the operation of multiplexing-circuit 26 may be formulated in the following way:

$$S[n:0] \rightarrow S[n:1] \quad (EQ. 2)$$

and, $$S[n] \rightarrow \begin{cases} \text{not } (S[n]) & \text{if } Q \text{ is odd} \\ S[n] & \text{otherwise.} \end{cases}$$

The redefined first sum, S[n:1], and the first carry, C[n:1], each of which now comprises n bits are fed into second adder 18, to provide a second sum, R. As one would appreciate, a sum of two n-bit binary-strings in an n-bit adder may yield an n+1-bit output. Again, without limiting the scope of the invention, the bits of the second sum are referred to hereinafter as bit 1 through bit n+1, i.e., R=R[n+1:1]. The least significant bit S[0] is concatenated to R from the right, thereby providing an n+2 binary-string R[n+1:0].

It is to be understood that although R comprises n+2 bits, the desired information can be fully retrieved using the n+1 least significant bit of R. In other words, once the n+1 bits R[n:0] are known, the value, the sign-bit and the overflow status of the results are obtained, as further described herein, and exemplified hereinafter. Thus, according to a preferred embodiment of the present invention, the overflow flag is set by electronic-circuit 22, using the bits R[n] and R[n−1], preferably according to the following rule:

$$OVF = \begin{cases} R[n] \vee R[n-1] & \text{if } Q = 0 \\ \text{not } (R[n]) \vee \text{not}(R[n-1]) & \text{if } Q = 4 \\ R[n] \oplus R[n-1] & \text{otherwise.} \end{cases} \quad (EQ. 3)$$

The symbols in Equation 3 are known symbols representing logical operators which are realized in electronic circuits by logical gates, specifically, ∨ is an OR operator and ⊕ is a XOR operator. For a mathematical proof of the correctness of Equation 3 the reader is referred to Appendix 1.

A skilled artisan would appreciate that the correct sign-bit of the result may depend on the overflow status. According to a preferred embodiment of the present invention, for odd Q, if OVF=0 then the sign-bit equals R[n] and if OVF=1 then the sign-bit is dictated by the sign of the majority of the 4 n-bit binary-strings, which can be written as $\lfloor Q/2 \rfloor$, where $\lfloor \ \rfloor$ represent the FLOOR operator. On the other hand, for even Q, irrespectively of the value of OVF, for Q=2 the sign-bit equals R[n] and for Q=0 or 4 the sign-bit equals the sign of the 4 inputs which can be written as $\lfloor Q/4 \rfloor$. Table 1 below summarizes the different cases and the corresponding sign-bits.

TABLE 1

| Q | OVF | sign-bit |
| --- | --- | --- |
| odd | 0 | R[n] |
| odd | 1 | $\lfloor Q/2 \rfloor$ |
| 0 or 4 | 0 or 1 | $\lfloor Q/4 \rfloor$ |
| 2 | 0 or 1 | R[n] |

Depending on the overflow status and on the sign-bit, as detailed above, the value of the addition of the 4 input n-bit binary-strings can now be determined. Thus, according to a preferred embodiment of the present invention, in cases in which no overflow is present, the correct value of the addition is R[n−1:0]. In all other cases, only n least significant bits of the correct addition value are R[n−1:0]. In these cases, in most known applications only the overflow and the sign-bit information are used for further processing. For example, one known scheme is to obtain saturation by replacing the second sum, R, with the highest or lowest possible n-bit string (for positive and negative result, respectively), thereby preventing the problematic overflow oscillations.

A description of the principles and operations of apparatus 10, for a preferred embodiment in which the data input consists of 3 n-bit binary-strings, X[n−1:0], Y[n−1:0] and Z[n−1:0], is herein provided.

According to the presently preferred embodiment of the invention, first adder 16 is an n-bit adder and second adder 18 is an n−1-bit adder. Thus, the present embodiment provides a further enhancement in processing time and allocated area. First adder 16 is fed by the 3 n-bit binary-strings and generates, similarly to the above embodiments, an n-bit first sum, S, and an n-bit first carry, C, which are denoted, without limiting the scope of the invention, by S[n−1:0] and C[n:1], respectively.

Similarly to the above embodiments, first electronic-circuit 20 serves for two purposes: one purpose is to calculate the parity query, Q, and the other purpose is to redefine S and C so that both S and C are simultaneously fed into second adder 18. It is appreciated that unlike the 4 inputs case, both S and C need to be redefined, since second adder 18 is an n−1-bit adder. On the other hand, in the present embodiment, the redefinition procedure of S and C is simpler because the most significant bit of S is not inverted (see Equation 2, with respect to the 4 inputs case).

Thus, according to the presently preferred embodiment of the invention, for the first sum, S, first electronic-circuit 20 truncates the least significant bit, and for the first carry, C, first electronic-circuit 20 truncates the most significant bit. As before, the least significant bit, S[0], which has been truncated from the first sum, is directly used as the least significant bit of the result, and it is not inputted to second adder 18. Thus, the inputs to second adder 18 are two n−1-bit binary-strings, S[n−1:1] and C[n−1:1].

According to a preferred embodiment of the present invention, S and C are summed by second adder 18, to provide a second sum, designated herein R[n−1:1] and a second carry, designated herein D[n−1:1]. Subsequently to the operation of second adder 18, S[0] is appended to R[n−1:1] from the right, so as to provide an n-bit binary-string R[n−1:0].

As will be shown below, in the presently preferred embodiment of the invention, for the purpose of determining the sign-bit and the overflow status, it is sufficient to infer only whether or not Q equals 0 or 3. As stated, the parity characteristics of Q are preferably determined by parity-logic-circuit 24.

Figure 8:
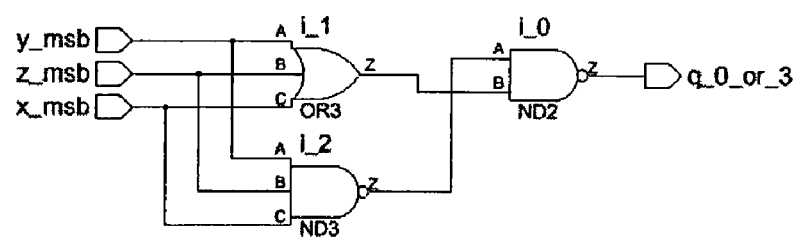
FIG. 8 shows one possible configuration of the various gates of a parity-logic-circuit, for 3 n-bit binary-string input, according to a preferred embodiment of the present invention.

Reference is now made to FIG. 8, detailing one possible configuration of the various gates of parity-logic-circuit 24, for 3 n-bit binary-strings input. The most significant bits of each of the 3 inputs strings are fed into parity-logic-circuit 24 to produce a bit "1" if and only if Q equals 0, or 3.

Once R, D (and Q) are known, the value, the sign-bit and the overflow are determined by second electronic-circuit 22. The overflow flag is set by second electronic-circuit 22, using the bits R[n−1] and D[n−1], preferably according to the following rule:

$$OVF = \begin{cases} R[n-1] \oplus R[n-1] & \text{if } Q = 0 \text{ or } Q = 3 \\ \text{not } (R[n-1]) \oplus D[n-1]) & \text{otherwise.} \end{cases} \quad \text{(EQ. 4)}$$

The sign-bit, which depends as before on the overflow status, is set, preferably by the following rule:

$$\text{sign-bit} = \begin{cases} R[n-1] & \text{if } OVF = 0 \\ \left\lfloor \dfrac{Q}{2} \right\rfloor & \text{if } OVF = 1. \end{cases} \quad \text{(EQ. 5)}$$

The value of the addition of the 3 input binary-strings, depends on the overflow status and the sign-bit, and is determined from R[n−1:0], as further detailed hereinabove.

According to a further embodiment of the present invention there is provided a method of determining a value, a sign-bit and an overflow status of an addition or a subtraction of at least three n-bit data inputs. The method comprising the following method steps, which are illustrated in a simplified flowchart shown in FIG. 9.

Figure 9:
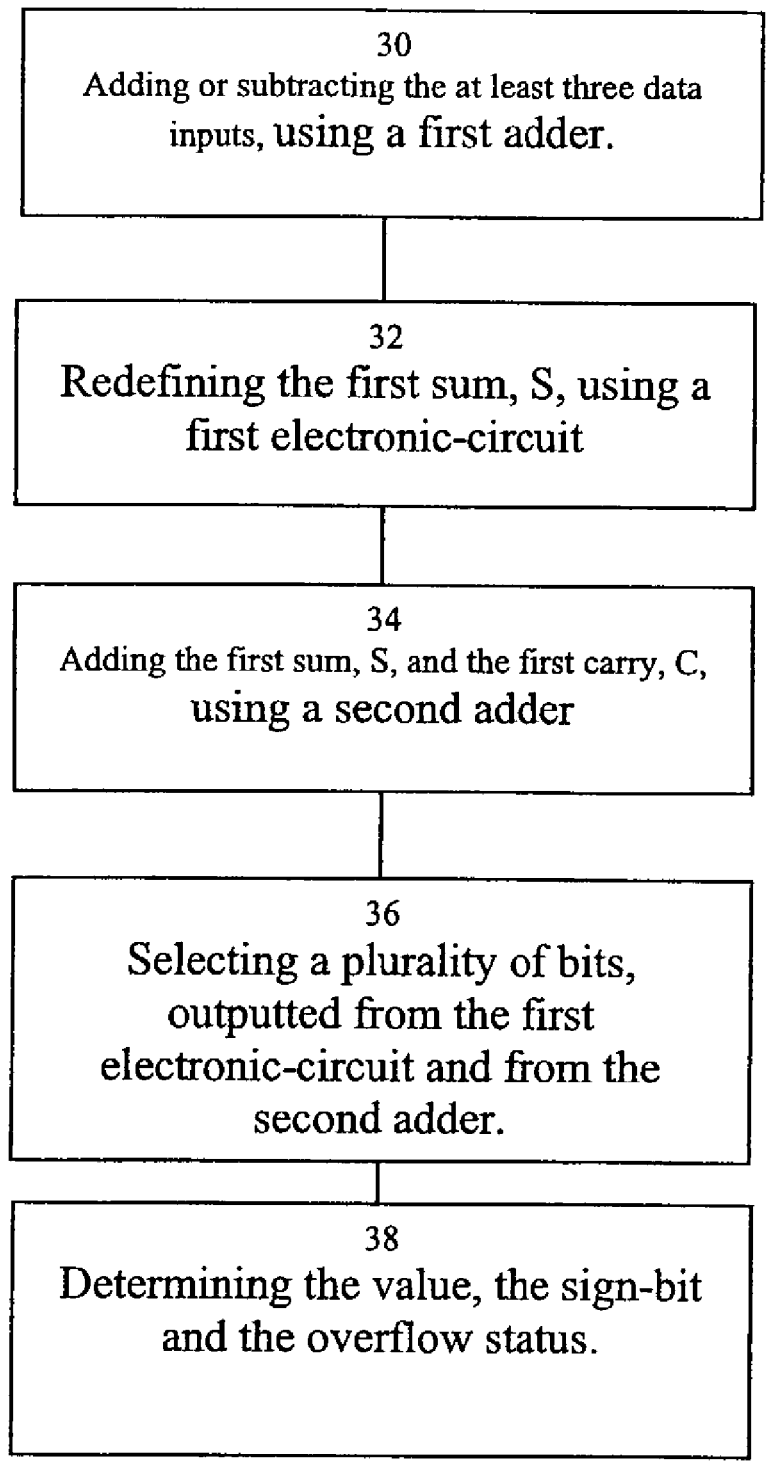
FIG. 9 is a simplified flowchart of a method of determining a value, a sign-bit and an overflow status of an addition of at least three n-bit data inputs, according to a preferred embodiment of the present invention.

Referring to FIG. 9, in a first step, represented by block 30, the at least three data inputs are added using a first adder, so as to provide a first sum, S, and a first carry, C. The first adder, which may be, for example, first adder 16, is preferably operable to add a plurality of m-bit addends, where m is smaller than or equal to n. In a second step, represented by block 32, the first sum, S, is redefined, using a first electronic-circuit (such as, e.g., first electronic circuit 20), as detailed hereinabove. In a third step, represented by block 34, the first sum, S, and the first carry, C, are added using a second adder, so as to provide a second sum, R, and a second carry, D. According to a preferred embodiment of the present invention, second adder, which may be, for example second adder 18, is operable to add a plurality of m-bit addends. As further detailed in the above embodiments, the preferred type of the adders depends on the number of data inputs which are processed by the method. In a fourth step of the method, represented by block 36, a plurality of bits which are outputted from the first electronic circuit and from the second adder are selected, and in a fifth step, represented by block 38, the plurality of bits are used for determining the overflow status, the value and the sign-bit of the addition of the at least three data inputs.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples which, together with the above description, illustrate the invention in a non-limiting fashion. The examples below demonstrate additions of 3 n-bit binary-strings and additions of 4 n-bit binary-strings. In the following, subtraction is carried out by taking a two's complement representation of the binary string and then adding. For ease of illustration, each string added is a 4-bit binary-string.

Figure 10A:
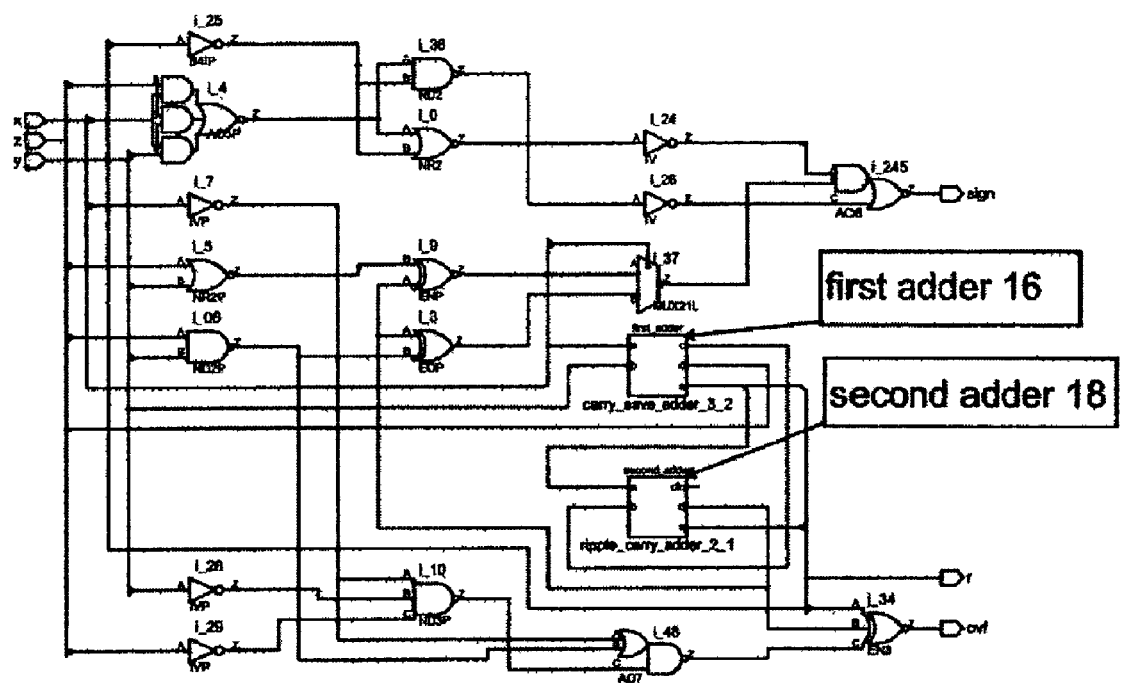
FIG. 10a shows circuitry used for adding 3 binary-strings, each having n-bits and represented as a single bus, according to a preferred embodiment of the present invention.
Figure 10B:
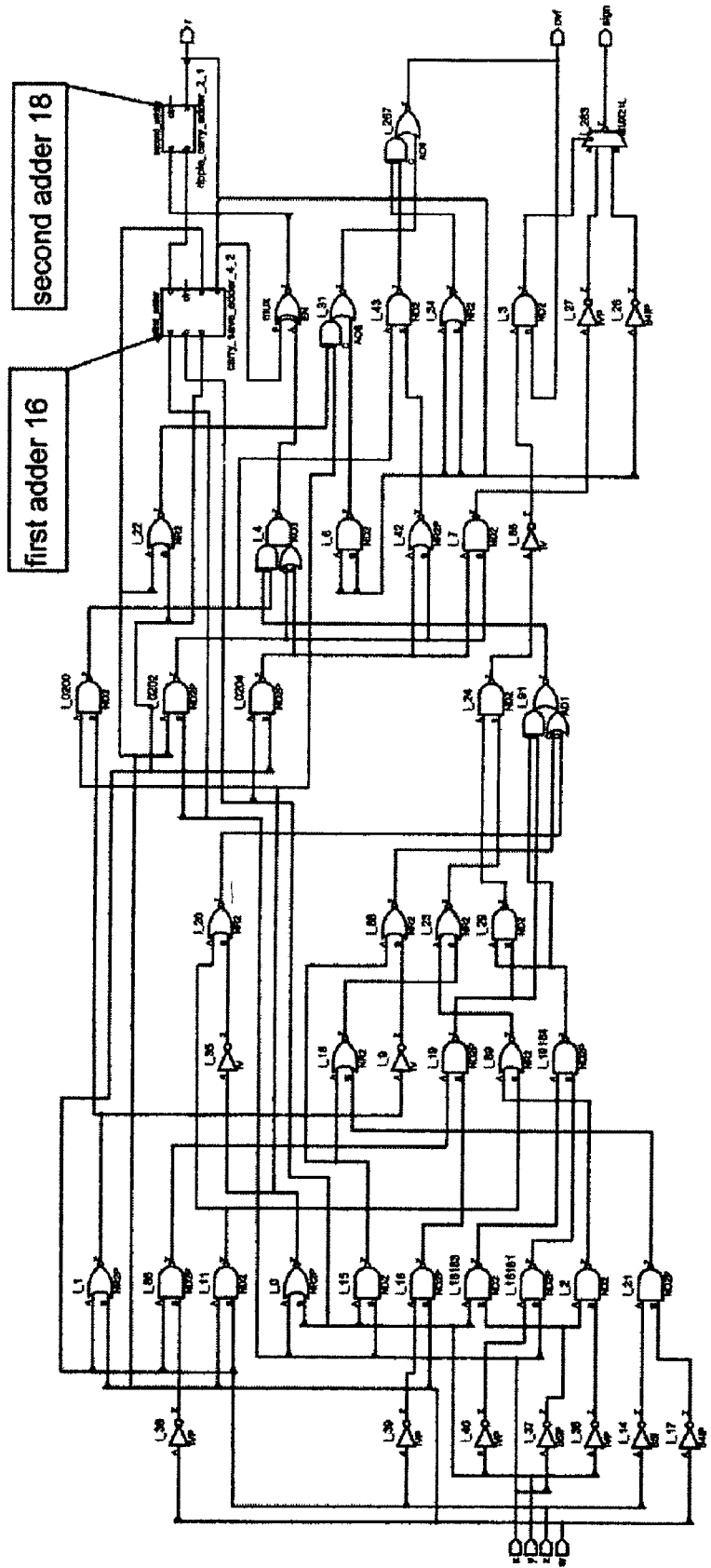
FIG. 10b shows circuitry used for adding 4 binary-strings, each having n-bits and represented as a single bus, according to a preferred embodiment of the present invention.

The examples below have been tested on a processor, designed to perform additions of up to 32-bit binary-strings, according to the above embodiments. The processor was developed by Analog Devices Inc., Herzelia, Israel, and is referred to as TigerSHARC (TS101S). Simplifications of portions of the TigerSHARC (TS101S) processor which are responsible for the addition of 3 and 4 binary-strings are shown in FIGS. 10*a* and 10*b*, respectively. In FIGS. 10*a* and 10*b* each binary-string input is represented by a single line which is to be understood as a bus of 32 bits. In FIG. 10*a* the 3 binary-string inputs are designated X, Y and Z, and in FIG. 10*b* the 4 binary-string inputs are designated X, Y, Z and W.

Figure 10C:
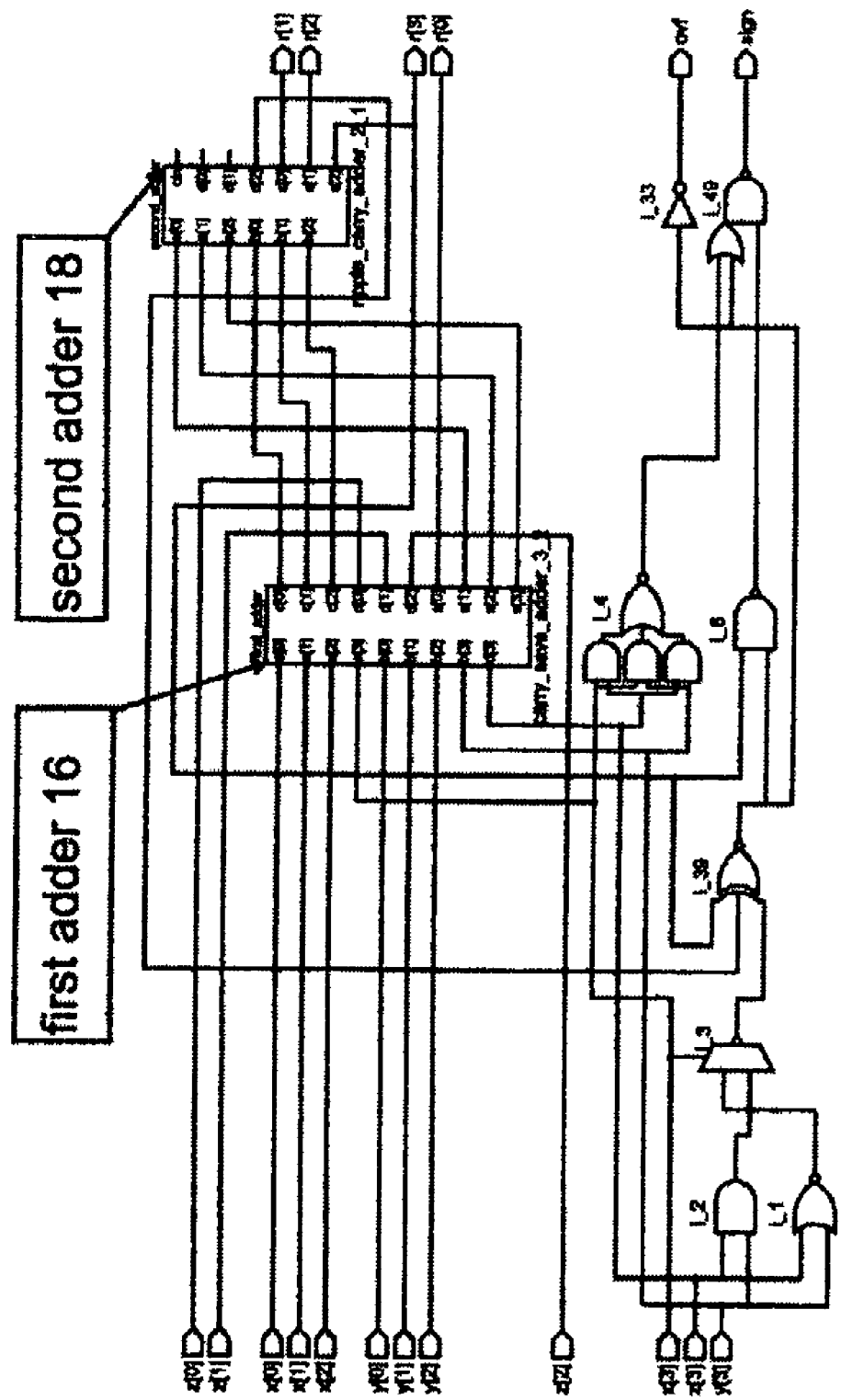
FIG. 10c shows circuitry used for adding 3 binary-strings, each having 4-bits, according to a preferred embodiment of the present invention.
Figure 10D:
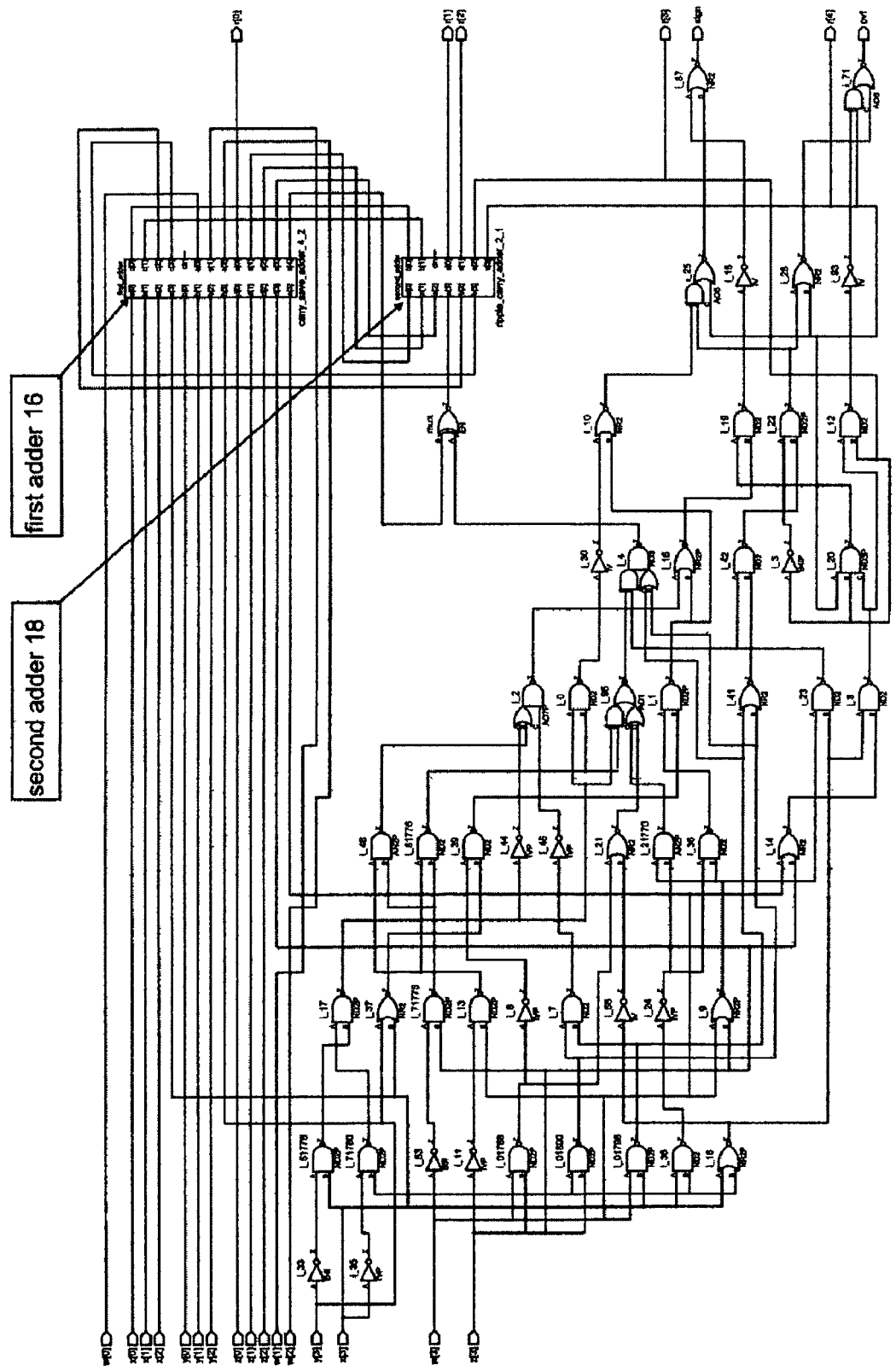
FIG. 10d shows circuitry used for adding 4 binary-strings, each having 4-bits, according to a preferred embodiment of the present invention.

More detailed diagrams showing, bit-by-bit, the circuitry used for adding 4-bit binary-strings are shown in FIG. 10*c* (for adding 3 binary-strings) and FIG. 10*d* (for adding 4 binary-strings).

Example 1

In this example 3 numbers are added to produce a sum having a positive overflow. The numbers are: 7+7+7=21.

```
  0 1 1 1
  0 1 1 1        Q = 0 + 0 + 0 = 0
  0 1 1 1        OVF = R[3]⊕D[3] = 1
  ───────        sign-bit = ⌊Q/2⌋ = 0
  0 1 1 1  S
  1 1 1    C
  ───────
  1 1 1    D
  0 1 0 1  R
```

Example 2

In this example 3 numbers are added to produce a sum having a negative overflow. The numbers are: −7−8−1=−16

```
  1 0 0 1
  1 0 0 0        Q = 1 + 1 + 1 = 3
  1 1 1 1        OVF = R[3]⊕D[3] = 1
  ───────        sign-bit = ⌊Q/2⌋ = 1
  1 1 1 0  S
  0 0 1    C
  ───────
  1 1 1    D
  0 0 0 0  R
```

Example 3

In this example 3 numbers are added to produce a positive sum having no overflow. The numbers are: −7+7+3=3

```
  1 0 0 1
  0 1 1 1        Q = 1 + 0 + 0 = 1
  0 0 1 1        OVF = not(R[3]⊕D[3]) = 0
  ───────        sign-bit = R[3] = 0
  1 1 0 1  S
  0 1 1    C
  ───────
  1 1 0    D
  0 0 1 1  R
```

Example 4

In this example 3 numbers are added to produce a sum having a negative overflow. The numbers are: −8−8+1=−15.

```
  1 0 0 0
  1 0 0 0        Q = 1 + 1 + 0 = 2
  0 0 0 1        OVF = not(R[3]⊕D[3]) = 1
  ───────        sign-bit = ⌊Q/2⌋ = 1
  0 0 0 1  S
  0 0 0    C
  ───────
  0 0 0    D
  0 0 0 1  R
```

Example 5

In this example 4 numbers are added to produce a sum having a positive overflow. The numbers are: 7+7+7+7=28

```
  0 1 1 1
  0 1 1 1
  0 1 1 1        Q = 0 + 0 + 0 + 0 = 0
  0 1 1 1        OVF = R[4] ∨ R[3] = 1
  ───────        sign-bit = ⌊Q/4⌋ = 0
  0 1 1 1 0  S
  0 1 1 1    C
  ─────────
  1 1 1 0 0  R
```

Example 6

In this example 4 numbers are added to produce a sum having a negative overflow. The numbers are: −7−8−1−6=−22

```
  1 0 0 1
  1 0 0 0
  1 1 1 1          Q = 1 + 1 + 1 + 1 = 4
  1 0 1 0          OVF = not (R[4]) ∨ not (R[3]) = 1
  ─────────        sign-bit = ⌊Q/4⌋ = 1
1 0 1 0 0   S
  1 0 1 1   C
  ─────────
0 1 0 1 0   R
```

Example 7

In this example 4 numbers are added to produce a positive sum having no overflow. The numbers are: −7+7−3+4=1

```
  1 0 0 1          Q = 1 + 0 + 1 + 0 = 2
  0 1 1 1          OVF = R[R] ⊕ R[3] = 0
  1 1 0 1          sign-bit = R[4] = 0
  0 1 0 0
  ─────────
  0 0 1 1 1   S
  1 1 0 1     C
  ─────────
  0 0 0 0 1   R
```

Example 8

In this example 4 numbers are added to produce a sum having a negative overflow. The numbers are: −8−8+1+2=−13

```
  1 0 0 0          Q = 1 + 1 + 0 + 0 = 2
  1 0 0 0          OVF = R[4] ⊕ R[3] = 1
  0 0 0 1          sign-bit = R[4] = 1
  0 0 1 0
  ─────────
  0 0 0 1 1   S
  1 0 0 0     C
  ─────────
  1 0 0 1 1   R
```

Example 9

In this example 4 numbers are added to produce a sum having a positive overflow. The numbers are: 7+6+4−1=16

```
  0 1 1 1          Q = 0 + 0 + 0 + 1 = 1
  0 1 1 0          S[4] is inverted
  0 1 0 0          OVF = R[4] ⊕ R[3] = 1
  1 1 1 1          sign-bit = ⌊Q/2⌋ = 0
  ─────────
1 0 0 1 0   S
  1 1 1 1   C
  ─────────
1 0 0 0 0   R
```

Example 10

In this example 4 numbers are added to produce a sum having a negative overflow. The numbers are: −7−8−4+2=−17

```
  1 0 0 1          Q = 1 + 1 + 1 + 0 = 3
  1 0 0 1          S[4] is inverted
  1 1 0 0          OVF = R[4] ⊕ R[3] = 1
  0 0 1 0          sign-bit = ⌊Q/2⌋ = 1
  ─────────
  1 1 1 1 1   S
  1 0 0 0     C
  ─────────
  0 1 1 1 1   R
```

Example 11

In this example 4 numbers are added to produce a positive sum having no overflow. The numbers are: 4+1+1−1=5

```
  0 1 0 0          Q = 0 + 0 + 0 + 0 + 1 = 1
  0 0 0 1          S[4] is inverted
  0 0 0 1          OVF = R[4] ⊕ R[3] = 0
  1 1 1 1          sign-bit = R[4] = 0
  ─────────
  1 1 0 1 1   S
  0 1 0 1     C
  ─────────
  0 0 1 0 1   R
```

Appendix 1

This appendix includes a formal mathematical proof derived by Dr. Guy Even of Tel-Aviv University, Tel-Aviv, Israel following a request by the present inventor.

The following proof is for the correctness of the overflow status which is introduced hereinabove in Equation 3. One of ordinarily skill in the art would appreciate that for the overflow status which is introduced hereinabove in Equation 4, a proof can be obtained using similar mathematical guidelines. Throughout the proof, the following definitions are used:

Definition 1: An unsigned value represented by a binary-string $A[k-1:0]$ is denoted by $<A[k-1:0]>$;

Definition 2: A two's complement value represented by a binary-string $A[k-1:0]$ is denoted by $\{A[k-1:0]\}$.

Definition 3: Let $x=\{X[n-1:0]\}$, $y=\{Y[n-1:0]\}$, $z=\{Z[n-1:0]\}$ and $w=\{W[n-1:0]\}$.

Definition 4: Let $x'=<X[n-2:0]>$, $y'=<Y[n-2:0]>$, $z'=<Z[n-2:0]>$ and $w'=<W[n-2:0]>$.

Definition 5: Let $s=x+y+z+w$.

Without lose of generality, Equation 3 may be proven by considering an equivalent procedure, which employs a ripple-carry adder. One would appreciate that the correctness of the overflow status arbitrating does not depend whether or not a carry has been propagated. Hence, in a first step of the equivalent procedure the four binary-strings are added using a ripple-carry adder. Each position [i] is fed by a carry-in, denoted by C'[i]. The carry-in can have a value in the range [0 . . . 3]. The bit R[i], of the second sum, R, is simply the parity of the sum of C'[i] and the four input bits in position [i]. A carry-out C'[i+1] is fed to position [i+1] and is defined by:

$$C'[i+1] = \lfloor (X[i]+Y[i]+Z[i]+W[i]+C'[i])/2 \rfloor.$$

In the equivalent procedure, the inversion of S[n] (in the cases in which such an inversion is executed, see Equation 2) is implemented by adding $2^n$ to the computed sum. It is to be understood that this implementation is equivalent to an inversion, as far as the n+1 bits of R are concerned.

As can be understood from Equation 3, there are five cases to be proven, depending on the five possible values (0÷4) of the parity query, Q.

Case: Q=0

For Q=0, the values of the bits R[n−1], C'[n] and R[n] are obtained from C, using following rules:

$$R[n-1] = C'[n-1](\text{mod } 2)$$

$$C'[n] = \lfloor C'[n-1]/2 \rfloor$$

$$R[n] = C'[n](\text{mod } 2)$$

In two's complement representation, Q=0 is equivalent to all four addends being non-negative. An overflow occurs if and only if $s \geq 2^{n-1}$. Since all addends are non-negative, their most significant bit is zero. This implies that an overflow occurs if and only if $C'[n-1] \geq 1$.

There are four possible values for C'[n−1]: 0, 1, 2 and 3. Table 2 below summarizes the resulting values of R[n−1], C'[n], and R[n], for each value of C'[n−1].

TABLE 2

| C'[n-1] | R[n-1] | C'[n] | R[n] | R[n]vR[n-1] | overflow? |
|---|---|---|---|---|---|
| 0 | 0 | 0 | 0 | 0 | No |
| 1 | 1 | 0 | 0 | 1 | Yes |
| 2 | 0 | 1 | 1 | 1 | Yes |
| 3 | 1 | 1 | 1 | 1 | Yes |

As can be seen from Table 2, the last two columns confirm that the overflow flag, OVF, from Equation 3 detects overflow correctly for this case.

Case: Q=1

For Q=1, the values of the bits R[n−1], C'[n] and R[n] are obtained from C, using following rules:

$$R[n-1] = 1 + C'[n-1](\text{mod } 2)$$

$$C'[n] = \lfloor (1+C'[n-1])/2 \rfloor$$

$$R[n] = 1 + C'[n](\text{mod } 2)$$

Note that the addition of $2^n$ in this case effects the value of R[n].

In two's complement representation, Q=1 is equivalent to three addends which are non-negative and one is negative. Overflows can occur in this case if and only if $\{R[n+1:0]\} \geq 2^{n-1}$. The assumption that exactly one addend is negative implies that $s = x'+y'+z'+w'-2^{n-1}$.

Therefore, $s \geq 2^{n-1}$ if and only if $x'+y'+z'+w' \geq 2 \cdot 2^{n-1}$, which happens if and only if $C'[n-1] \geq 2$.

Table 3 below summarizes the resulting values of R[n−1], C'[n], and R[n], for each value of C'[n−1].

TABLE 3

| C'[n-1] | R[n-1] | C'[n] | R[n] | R[n]⊕R[n-1] | overflow? |
|---|---|---|---|---|---|
| 0 | 1 | 0 | 1 | 0 | No |
| 1 | 0 | 1 | 0 | 0 | No |
| 2 | 1 | 1 | 0 | 1 | Yes |
| 3 | 0 | 2 | 1 | 1 | Yes |

As can be seen from Table 3, the last two columns confirm that the overflow flag, OVF, from Equation 3 detects overflow correctly for this case.

Case: Q=2

For Q=2, the values of the bits R[n−1], C'[n] and R[n] are obtained from C, using following rules:

$$R[n-1] = 2 + C'[n-1](\text{mod } 2)$$

$$C'[n] = \lfloor (2+C'[n-1])/2 \rfloor$$

$$R[n] = C'[n](\text{mod } 2)$$

In two's complement representation Q=2 is equivalent to two addends which are non-negative and two which are negative. Two overflows can occur in this case; either $s < -2^{n-1}$ or $s \geq 2^{n-1}$. The assumption that exactly two addends are negative implies that $s = x'+y'+z'+w'-2 \cdot 2^{n-1}$.

Therefore, $s < -2^{n-1}$ if and only if $x'+y'+z'+w' < 2^{n-1}$, which happens if and only if $C'[n-1] < 1$.

Similarly, $s \geq 2^{n-1}$ if and only if $x'+y'+z'+w' \geq 3 \cdot 2^{n-1}$ which happens if and only if $C'[n-1] \geq 3$. Hence, overflow occurs in this case if and only if $C'[n-1] \in \{0,3\}$.

Table 4 below summarizes the resulting values of R[n−1], C'[n], and R[n], for each value of C'[n−1].

TABLE 4

| C'[n-1] | R[n-1] | C'[n] | R[n] | R[n]⊕R[n-1] | overflow? |
|---|---|---|---|---|---|
| 0 | 0 | 1 | 1 | 1 | yes |
| 1 | 1 | 1 | 1 | 0 | no |
| 2 | 0 | 2 | 0 | 0 | no |
| 3 | 1 | 2 | 0 | 1 | yes |

As can be seen from Table 4, the last two columns confirm that the overflow flag, OVF, from Equation 3 detects overflow correctly for this case.

Case: Q=3

For Q=3, the values of the bits R[n−1], C'[n] and R[n] are obtained from C, using following rules:

$$R[n-1] = 3 + C'[n-1](\text{mod } 2)$$

$$C'[n] = \lfloor (3+C'[n-1])/2 \rfloor$$

$$R[n] = 1 + C'[n](\text{mod } 2)$$

Note that the addition of $2^n$ in this case effects the value of R[n].

In two's complement representation Q=3 is equivalent to three addends which are negative and one which is non-negative. Overflows can occur in this case if and only if $s < -2^{n-1}$. The assumption that exactly three addends are negative implies that $s = x'+y'+z'+w'-3 \cdot 2^{n-1}$.

Therefore, $s < -2^{n-1}$ if and only if $x'+y'+z'+w' < 2 \cdot 2^{n-1}$, which happens if and only if $C'[n-1] < 2$.

Table 5 below summarizes the resulting values of R[n−1], C'[n], and R[n], for each value of C'[n−1].

TABLE 5

| C'[n-1] | R[n-1] | C'[n] | R[n] | R[n]⊕R[n-1] | overflow? |
|---|---|---|---|---|---|
| 0 | 1 | 1 | 0 | 1 | yes |
| 1 | 0 | 2 | 1 | 1 | yes |
| 2 | 1 | 2 | 1 | 0 | no |
| 3 | 0 | 3 | 0 | 0 | no |

As can be seen from Table 5, the last two columns confirm that the overflow flag, OVF, from Equation 3 detects overflow correctly for this case.

Case: Q=4

For Q=4, the values of the bits R[n−1], C'[n] and R[n] are obtained from C, using following rules:

$$R[n-1] = 4 + C'[n-1] \pmod 2$$

$$C'[n] = \lfloor (4 + C'[n-1])/2 \rfloor$$

$$R[n] = C'[n] \pmod 2$$

In two's complement representation, Q=4 is equivalent to all four addends being negative. An overflow occurs if and only if $s < -2^{n-1}$. The assumption that all four addends are negative implies that $s = x' + y' + z' + w' - 4 \cdot 2^{n-1}$.

Therefore, $s < -2^{n-1}$ if and only if $x' + y' + z' + w' < 3 \cdot 2^{n-1}$. Hence, an overflow occurs if and only if C'[n−1]<3.

Table 6 below summarizes the resulting values of R[n−1], C'[n], and R[n], for each value of C'[n−1].

TABLE 6

| C'[n-1] | R[n-1] | C'[n] | R[n] | R[n]vR[n-1] | overflow? |
|---|---|---|---|---|---|
| 0 | 0 | 2 | 0 | 1 | yes |
| 1 | 1 | 2 | 0 | 1 | yes |
| 2 | 0 | 3 | 1 | 1 | yes |
| 3 | 1 | 3 | 1 | 0 | no |

As can be seen from Table 6, the last two columns confirm that the overflow flag, OVF, from Equation 3 detects overflow correctly for this case.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. Apparatus for determining a value and an overflow status of an addition of at least three n-bit data inputs, wherein n is an integer, the apparatus comprising:
   a first adder, for adding the at least three n-bit data inputs, to provide a first output having at least 2n bits;
   a second adder for adding a portion of bits of said first output, said second adder being operable to add a plurality of m-bit addends, m being smaller than or equal to n;
   at least two electronic-circuits, operatively associated with said first adder and said second adder;
   said first adder, said second adder and said at least two electronic-circuits are constructed and designed to obtain the value and the overflow status of the addition of the at least three data inputs, using predetermined parity rules being associated with a parity characteristic of the at least three data inputs.

2. The apparatus of claim 1, wherein each of said first and said second adders is independently selected from the group consisting of a carry-save adder and a ripple-carry adder.

3. The apparatus of claim 1, wherein said first adder is an n-bit adder.

4. The apparatus of claim 3, wherein said second adder is an n-bit adder.

5. The apparatus of claim 3, wherein said second adder is an n−1-bit adder.

6. The apparatus of claim 1, wherein each of said at least two electronic-circuits is operable to execute a plurality of operations, each independently selected from the group consisting of: concatenation, inversion and truncation of at least one bit.

7. The apparatus of claim 1, wherein at least one of said at least two electronic-circuits comprises a parity-logic-circuit for receiving the at least three data inputs and for outputting sign-distribution information.

8. The apparatus of claim 1, wherein at least one of said at least two electronic-circuits comprises an arbitrator, for arbitrating the overflow status using at least two bits outputted from said second adder so as to provide an overflow flag, OVF, characterizing the overflow status.

9. The apparatus of claim 1, wherein at least one of said at least two electronic-circuits is operable to determine a sign-bit of the addition of the at least three data inputs, using a predetermined sign rule.

10. The apparatus of claim 9, wherein said at least three data inputs are two's complement binary-strings.

11. The apparatus of claim 9, wherein the at least three n-bit data inputs are 4 n-bit binary-strings, and further wherein said at least two electronic-circuits are a first electronic-circuit and a second electronic-circuit.

12. The apparatus of claim 11, wherein each of said first and said second adders is an n-bit adder.

13. The apparatus of claim 11, wherein said first output comprises a first sum, S, comprising at least n+1 bits and a first carry, C, comprising at least n bits.

14. The apparatus of claim 13, wherein said first electronic-circuit is operable to truncate a least significant bit, S[0], from said first sum, S, so as to redefine said first sum, S, to be an n-bit binary-string, S[n:1].

15. The apparatus of claim 13, wherein said first electronic-circuit comprise a parity-logic-circuit operable to determine a parity query, Q, using most significant bits of said 4 n-bit binary-strings, and further wherein said first electronic-circuit comprise a multiplexing-circuit operable to invert a most significant bit, S[n], of said first sum, S, if and only if said parity query, Q, is odd.

16. The apparatus of claim 15, wherein said second adder is operable to generate a second sum, R, comprising n bits.

17. The apparatus of claim 16, wherein a least significant bit, R[0], of said second sum, R, equals a least significant bit, S[0], of said first sum, S.

18. The apparatus of claim 16, wherein n least significant bits of the addition value of said 4 n-bit binary-strings are n least significant bits of said second sum, R.

19. The apparatus of claim 16, wherein said second electronic-circuit comprises an arbitrator for arbitrating the overflow status using at least two bits outputted from said second adder and said predetermined parity rules, so as to provide an overflow flag, OVF, characterizing the overflow status.

20. The apparatus of claim 19, wherein said predetermined parity rules comprises:
if said Q equals 0 then set said OVF to be R[n]vR[n−1];
if said Q equals 4 then set said OVF to be not(R[n])vnot(R[n−1]); and
otherwise set said OVF to be R[n]⊕R[n−1];
where v is an OR operator, ⊕ is a XOR operator, and R[n] and R[n−1] are first and second most significant bits of said second sum, R.

21. The apparatus of claim 19, wherein said predetermined sign rule comprises:
if said Q is odd and said OVF equals 0 then set said sign-bit to be R[n];
if said Q is odd and said OVF equals 1 then set said sign-bit to be ⌊Q/2⌋;
if said Q equals 2 then set said sign-bit to be R[n]; and
if said Q equals 0 or said Q equal 4 then set said sign-bit to be ⌊Q/4⌋;
where ⌊ ⌋ is a FLOOR operator.

22. The apparatus of claim 9, wherein said at least three n-bit data inputs are 3 n-bit binary-strings and further wherein said at least two electronic-circuits are a first electronic-circuit and a second electronic-circuit.

23. The apparatus of claim 22, wherein said first adder is an n-bit adder and said second adder is an n−1-bit adder.

24. The apparatus of claim 23, wherein said first adder is operable to generate a first sum, S, comprising n bits and a first carry, C, comprising n bits.

25. The apparatus of claim 24, wherein said first electronic-circuit is operable to:
(a) truncate a least significant bit, S[0], from said first sum, S, so as to redefine said first sum, S, to be an n−1-bit binary-string, S[n−1:1]; and
(b) truncate a most significant bit, C[n], from said first carry, C, so as to redefine said first carry, C, to be an n−1-bit binary-string, C[n−1:1].

26. The apparatus of claim 24, wherein said second adder is operable to generate a second sum, R, and a second carry, D, each of said R and said D comprising n−1 bits.

27. The apparatus of claim 26, wherein a least significant bit, R[0], of said second sum, R, equals a least significant bit, S[0], of said first sum, S.

28. The apparatus of claim 26, wherein n least significant bits of the addition value of said 3 n-bit binary-strings are n least significant bits of said second sum, R.

29. The apparatus of claim 26, wherein said second electronic-circuit comprises an arbitrator, for arbitrating the overflow status using at least two bits outputted from said second adder and said predetermined parity rules, so as to provide an overflow flag, OVF, characterizing the overflow status.

30. The apparatus of claim 29, wherein said first electronic-circuit comprise a parity-logic-circuit operable to determine a parity query, Q, using most significant bits of said 3 n-bit binary-strings.

31. The apparatus of claim 30, wherein said predetermined parity rules comprising:
if said Q equals 0 or said Q equals 3 then set said OVF to be R[n−1]⊕D[n−1];
otherwise set said OVF to be not(R[n−1]⊕D[n−1]);
where ⊕ is a XOR operator, R[n−1] a most significant bit of said second sum, R, and D[n−1] is a most significant bit of said second carry, D.

32. The apparatus of claim 31, wherein said arbitrator is operable to execute a second conditional operation to set said sign-bit, said second conditional operation comprising:
if said OVF equals 0 then set said sign-bit to be R[n−1]; and
if said OVF equals 1 then set said sign-bit to be ⌊Q/2⌋, where ⌊ ⌋ is a FLOOR operator.

33. A method of determining a value and an overflow status of an addition of at least three n-bit data inputs, wherein n is an integer, the method comprising:
adding the at least three n-bit data inputs using a first adder, so as to provide a first output having at least 2n bits;
adding a portion of bits of said first output, using a second adder which is operable to add a plurality of m-bit addends, m being smaller than or equal to n; and
using a portion of bits from said first output, a portion of bits outputted from said second adder and predetermined parity rules, associated with a parity characteristic of the at least three data inputs, for determining the value and the overflow status of the addition of the at least three n-bit data inputs.

34. The method of claim 33, wherein each of said first and said second adders is independently selected from the group consisting of a carry-save adder and a ripple-carry adder.

35. The method of claim 33, wherein said first adder is an n-bit adder.

36. The method of claim 35, wherein said second adder is an n-bit adder.

37. The method of claim 35, wherein said second adder is an n−1-bit adder.

38. The method of claim 33, wherein said determining is by executing a plurality of operations, each independently selected from the group consisting of: concatenation, inversion and truncation of at least one bit.

39. The method of claim 33, further comprising determining a sign-distribution of the at least three data inputs.

40. The method of claim 33, further comprising determining a sign-bit of the addition of the at least three data inputs, using a predetermined sign rule.

41. The method of claim 40, wherein said at least three data inputs are two's complement binary-strings.

42. The method of claim 40, wherein the at least three n-bit data inputs are 4 n-bit binary-strings.

43. The method of claim 42, wherein each of said first and said second adders is an n-bit adder.

44. The method of claim 42, wherein said first output comprises a first sum, S, comprising at least n+1 bits and a first carry, C, comprising at least n bits.

45. The method of claim 44, further comprising truncating a least significant bit, S[0], from said first sum, S, so as to redefine said first sum, S, to be an n-bit binary-string, S[n:1].

46. The method of claim 44, further comprising:
determining a parity query, Q, using most significant bits of said 4 n-bit binary-strings; and
inverting a most significant bit, S[n], of said first sum, S, if and only if said parity query, Q, is odd.

47. The method of claim 46, further comprising generating a second sum, R, comprising n bits.

48. The method of claim 47, wherein a least significant bit, R[0], of said second sum, R, equals a least significant bit, S[0], of said first sum, S.

49. The method of claim 47, wherein n least significant bits of the addition value of said 4 n-bit binary-strings are n least significant bits of said second sum, R.

50. The method of claim 49, further comprising setting an overflow flag, OVF, characterizing the overflow status, using two bits of said second sum, R, and using said predetermined parity rules.

51. The method of claim 50, wherein said predetermined parity rules comprises:
if said Q equals 0 then set said OVF to be R[n]vR[n−1];
if said Q equals 4 then set said OVF to be not(R[n])vnot(R[n−1]); and
otherwise set said OVF to be R[n]⊕R[n−1];
where v is an OR operator, ⊕ is a XOR operator, and R[n] and R[n−1] are first and second most significant bits of said second sum, R.

52. The method of claim 50, wherein said predetermined sign rule comprises:
if said Q is odd and said OVF equals 0 then set said sign-bit to be R[n];
if said Q is odd and said OVF equals 1 then set said sign-bit to be ⌊Q/2⌋;
if said Q equals 2 then set said sign-bit to be R[n]; and
if said Q equals 0 or said Q equal 4 then set said sign-bit to be ⌊Q/4⌋;
where ⌊ ⌋ is a FLOOR operator.

53. The method of claim 40, wherein said at least three n-bit data inputs are 3 n-bit binary-strings.

54. The method of claim 53, wherein said first adder is an n-bit adder and said second adder is an n−1-bit adder.

55. The method of claim 54, wherein said first output comprises a first sum, S, comprising at least n bits and a first carry, C, comprising at least n bits.

56. The method of claim 55, further comprising:
truncating a least significant bit, S[0], from said first sum, S, so as to redefine said first sum, S, to be an n−1-bit binary-string, S[n−1:1]; and
truncating a most significant bit, C[n], from said first carry, C, so as to redefine said first carry, C, to be an n−1-bit binary-string, C[n−1:1].

57. The method of claim 55, further comprising generating a second sum, R, and a second carry, D, each of said R and said D comprising n−1 bits.

58. The method of claim 57, wherein a least significant bit, R[0], of said second sum, R, equals a least significant bit, S[0], of said first sum, S.

59. The method of claim 57, wherein n least significant bits of the addition value of said 3 n-bit binary-strings are n least significant bits of said second sum, R.

60. The method of claim 57, further comprising determining a parity query, Q using most significant bits of said 3 n-bit binary-strings.

61. The method of claim 60, further comprising setting an overflow flag, OVF, characterizing the overflow status, using said predetermined parity rules, said predetermined parity rules comprising:
if said Q equals 0 or said Q equals 3 then set said OVF to be R[n−1]⊕D[n−1]; and
otherwise set said OVF to be not(R[n−1]⊕D[n−1]);
where ⊕ is a XOR operator, R[n−1] a most significant bit of said second sum, R, and D[n−1] is a most significant bit of said second carry, D.

62. The method of claim 61, wherein said predetermined sign rule comprises:
if said OVF equals 0 then set said sign-bit to be R[n−1]; and
if said OVF equals 1 then set said sign-bit to be ⌊Q/2⌋, where ⌊ ⌋ is a FLOOR operator.

63. An apparatus for determining a value an overflow status of an addition or a subtraction of 4 n-bit binary-strings, wherein n is an integer, the apparatus comprising:
a first adder for simultaneously adding the 4 n-bit binary-strings to generate a first sum, S, and a carry, C, said first adder being an n-bit adder.
a first electronic-circuit, for redefining said first sum, S, using predetermined parity rules, said predetermined parity rules being associated with a parity characteristic of the 4 n-bit binary-strings;
a second adder for adding said first sum, S, and said carry, C, so as to provide a second sum, R, said second adder being an n-bit adder; and
a second electronic-circuit, for determining the value and the overflow status of the 4 n-bit binary-strings, using bits outputted from said first electronic-circuit and from said first adder.

64. The apparatus of claim 63, wherein each of said first and said second adders is independently selected from the group consisting of a carry-save adder and a ripple-carry adder.

65. The apparatus of claim 63, wherein each of said first and said second electronic-circuit is operable to execute a plurality of operations, each independently selected from the group consisting of: concatenation, inversion and truncation of at least one bit.

66. The apparatus of claim 63, wherein said first electronic-circuit comprises a parity-logic-circuit for receiving the 4 n-bit binary-strings and for outputting sign-distribution information.

67. The apparatus of claim 63, wherein said second electronic-circuit comprises an arbitrator, for arbitrating the overflow status using at least two bits outputted from said second adder so as to provide an overflow flag, OVF, characterizing the overflow status.

68. The apparatus of claim 63, wherein second electronic-circuit is operable to determine a sign-bit of the addition of the 4 n-bit binary-strings, using a predetermined sign rule.

69. The apparatus of claim 68, wherein the 4 n-bit binary-strings are two's complement binary-strings.

70. The apparatus of claim 68, wherein said first sum, S, comprises at least n+1 bits and said first carry, C, comprises at least n bits.

71. The apparatus of claim 70, wherein said first electronic-circuit is operable to truncate a least significant bit, S[0], from said first sum, S, so as to redefine said first sum, S, to be an n-bit binary-string, S[n:1].

72. The apparatus of claim 70, wherein said first electronic-circuit comprise a parity-logic-circuit operable to determine a parity query, Q, using most significant bits of the 4 n-bit binary-strings, and further wherein said first electronic-circuit comprise a multiplexing-circuit operable to invert a most significant bit, S[n], of said first sum, S, if and only if said parity query, Q, is odd.

73. The apparatus of claim 72, wherein said second sum, R, comprises n+1 bits.

74. The apparatus of claim 73, wherein a least significant bit, R[0], of said second sum, R, equals a least significant bit, S[0], of said first sum, S.

75. The apparatus of claim 73, wherein n least significant bits of the addition value of the 4 n-bit binary-strings are n least significant bits of said second sum, R.

76. The apparatus of claim 73, wherein said second electronic-circuit comprises an arbitrator, for arbitrating the overflow status using at least two bits outputted from said second adder so as to provide an overflow flag, OVF, characterizing the overflow status.

77. The apparatus of claim 76, wherein said arbitrator operable to execute a first conditional operation on two bits of said second sum, R, to set said overflow flag, OVF, said two bits designated R[n] and R[n−1].

78. The apparatus of claim 77, wherein said first conditional operation comprises:
if said Q equals 0 then set said OVF to be R[n]vR[n−1];
if said Q equals 4 then set said OVF to be not(R[n])vnot(R[n−1]); and
otherwise set said OVF to be R[n]⊕R[n−1];
where v is an OR operator and ⊕ is a XOR operator.

79. The apparatus of claim 76, wherein said predetermined sign rule comprises:
if said Q is odd and said OVF equals 0 then set said sign-bit to be R[n];
if said Q is odd and said OVF equals 1 then set said sign-bit to be ⌊Q/2⌋;
if said Q equals 2 then set said sign-bit to be R[n]; and
if said Q equals 0 or said Q equal 4 then set said sign-bit to be ⌊Q/4⌋;
where ⌊ ⌋ is a FLOOR operator.

80. An apparatus for determining a value, a sign-bit and an overflow status of an addition or a subtraction of 3 n-bit binary-strings, wherein n is an integer, the apparatus comprising:
a first adder for simultaneously adding the 3 n-bit binary-strings to generate a first sum, S, and a first carry, C, said first adder being an n-bit adder;
a first electronic-circuit, for truncating said first sum, S, and said first carry, C, so that said first sum, S, and said first carry, C, comprises n−1 bits;
a second adder for adding said first sum, S, and said carry, C, so as to provide a second sum, R, and a second carry, D, said second adder being an n−1-bit adder; and
a second electronic-circuit, for determining the value and the overflow status of the 3 n-bit binary-strings, using bits outputted from said first electronic-circuit and from said first adder.

81. The apparatus of claim 80, wherein each of said first and said second adders is independently selected from the group consisting of a carry-save adder and a ripple-carry adder.

82. The apparatus of claim 80, wherein each of said first and said second electronic-circuit is operable to execute a plurality of operations, each independently selected from the group consisting of: concatenation, inversion and truncation of at least one bit.

83. The apparatus of claim 80, wherein said first electronic-circuit comprises a parity-logic-circuit for receiving the 3 n-bit binary-strings and for outputting sign-distribution information.

84. The apparatus of claim 80, wherein said second electronic-circuit comprises an arbitrator, for arbitrating the overflow status using at least two bits outputted from said second adder so as to provide an overflow flag, OVF, characterizing the overflow status.

85. The apparatus of claim 80, wherein said second electronic-circuits is operable to determine a sign-bit of the addition of the 3 n-bit binary-strings, using a predetermined sign rule.

86. The apparatus of claim 85, wherein the 3 n-bit binary-strings are two's complement binary-strings.

87. The apparatus of claim 85, wherein said first adder is an n-bit adder and said second adder is an n−1-bit adder.

88. The apparatus of claim 87, wherein said first sum, S, comprises n bits and said first carry, C, comprises n bits.

89. The apparatus of claim 88, wherein said first electronic-circuit is operable to:
(a) truncate a least significant bit, S[0] from said first sum, S, so as to redefine said first sum, S, to be an n−1-bit binary-string, S[n−1:1]; and
(b) truncate a most significant bit, C[n], from said first carry, C, so as to redefine said first carry, C, to be an n−1-bit binary-string, C[n−1:1].

90. The apparatus of claim 88, wherein each of said second sum, R, and said second carry, D, comprises n−1 bits.

91. The apparatus of claim 90, wherein a least significant bit, R[0], of said second sum, R, equals a least significant bit, S[0], of said first sum, S.

92. The apparatus of claim 90, wherein n least significant bits of the addition value of the 3 n-bit binary-strings are n least significant bits of said second sum, R.

93. The apparatus of claim 90, wherein said second electronic-circuit comprises an arbitrator, for arbitrating the overflow status using at least two bits outputted from said second adder so as to provide an overflow flag, OVF, characterizing the overflow status.

94. The apparatus of claim 93, wherein said first electronic-circuit comprise a parity-logic-circuit operable to determine a parity query, Q using most significant bits of the 3 n-bit binary-strings.

95. The apparatus of claim 94, wherein said arbitrator is operable to execute a first conditional operation on a most significant bit, R[n−1], of said second sum, R, and on a most significant bit, D [n−1], of said second carry, D, to set said overflow flag, OVF, said first conditional operation comprising:
if said Q equals 0 or said Q equals 3 then set said OVF to be R[n−1]⊕D[n−1];
otherwise set said OVF to be not(R[n−1]⊕D[n−1]);
where ⊕ is a XOR operator.

96. The apparatus of claim 95, wherein said predetermined sign rule comprises:
if said OVF equals 0 then set said sign-bit to be R[n−1]; and
if said OVF equals 1 then set said sign-bit to be ⌊Q/2⌋,
where ⌊ ⌋ is a FLOOR operator.

97. An arithmetic and logic unit for digital computing, the unit comprising adding circuitry, the adding circuitry being operable to determine a value, a sign and an overflow status of an addition of at least three n-bit data inputs, wherein n is an integer, the adding circuitry comprising:
a first adder, for adding the at least three n-bit data inputs, to provide a first output having at least 2n bits;
a second adder for adding a portion of bits of said first output, said second adder being operable to add a plurality of m-bit addends, m being smaller than or equal to n;
at least two electronic-circuits, operatively associated with said first adder and said second adder;

said first adder, said second adder and said at least two electronic-circuits are constructed and designed to obtain the value, the sign and the overflow status of the addition of the at least three data inputs, using predetermined parity rules being associated with a parity characteristic of the at least three data inputs.

* * * * *

UNITED STATES PATENT AND TRADEMARK OFFICE
CERTIFICATE OF CORRECTION

PATENT NO. : 7,051,062 B2  Page 1 of 1
APPLICATION NO. : 10/238711
DATED : May 23, 2006
INVENTOR(S) : Jalfon It is certified that error appears in the above-identified patent and that said Letters Patent is hereby corrected as shown below:

In Claim 78, column 27, lines 20, 21 and 24, please change "v" to --v--

Signed and Sealed this

Twenty-eighth Day of November, 2006

JON W. DUDAS
*Director of the United States Patent and Trademark Office*